(12) United States Patent
Behera et al.

(10) Patent No.: US 12,199,918 B2
(45) Date of Patent: Jan. 14, 2025

(54) RF ADAPTIVE DIVERSITY AND METHOD FOR MAXIMIZING CAPACITY IN A WIRELESS TRANSMISSION

(71) Applicant: SpearIx Technologies, Inc., Cedar Park, TX (US)

(72) Inventors: Manas Behera, Cedar Park, TX (US); Juan Conchas, Austin, TX (US)

(73) Assignee: Spearix Technologies, Inc., Austin, TX (US)

( * ) Notice: Subject to any disclaimer, the term of this patent is extended or adjusted under 35 U.S.C. 154(b) by 297 days.

(21) Appl. No.: 17/699,169

(22) Filed: Mar. 21, 2022

(65) Prior Publication Data

US 2022/0311584 A1    Sep. 29, 2022

Related U.S. Application Data

(60) Provisional application No. 63/300,264, filed on Jan. 18, 2022, provisional application No. 63/165,112, filed on Mar. 23, 2021.

(51) Int. Cl.
*H04L 5/00* (2006.01)
*H04W 72/044* (2023.01)
*H04W 72/0453* (2023.01)

(52) U.S. Cl.
CPC .......... *H04L 5/0055* (2013.01); *H04L 5/0044* (2013.01); *H04L 5/0098* (2013.01); *H04W 72/0453* (2013.01); *H04W 72/0473* (2013.01)

(58) Field of Classification Search
None
See application file for complete search history.

(56) References Cited

U.S. PATENT DOCUMENTS

| | | | | |
|---|---|---|---|---|
| 2002/0122383 A1* | 9/2002 | Wu | ...... | H04B 7/0891 370/208 |
| 2005/0243780 A1* | 11/2005 | Trainin | ...... | H04L 1/1671 370/312 |
| 2007/0243831 A1* | 10/2007 | Seki | ...... | H04B 7/0417 375/267 |
| 2008/0009304 A1* | 1/2008 | Fry | ...... | H04W 52/0245 455/127.1 |
| 2012/0076228 A1* | 3/2012 | Wu | ...... | H04B 7/0417 375/267 |

(Continued)

*Primary Examiner* — Lonnie V Sweet
(74) *Attorney, Agent, or Firm* — André Grouwstra

(57) ABSTRACT

A wireless transmitter includes RF transmitters, an RF receiver, and a processor. It receives an ACK signal that specifies an RF mode and diversity information. The receiver receives a framed data packet that includes first PHY parameters. It determines second PHY parameters based on the diversity information, and replaces the first PHY parameters with the second PHY parameters. It transmits data via multiple diversity channels, according to the diversity information.

A wireless receiver includes multiple RF receivers and an RF transmitter. It receives data in accordance with first diversity settings in a first RF mode. It determines a current reception condition and predicts a future reception condition from a dominant aggressor. It uses the future reception condition to determine a second RF mode with second diversity settings and includes the second diversity settings in an acknowledge signal.

17 Claims, 13 Drawing Sheets

(56) References Cited

U.S. PATENT DOCUMENTS

| | | | | |
|---|---|---|---|---|
| 2013/0336242 | A1* | 12/2013 | Rajagopal | H04W 24/00 370/329 |
| 2014/0161048 | A1* | 6/2014 | Attar | H04W 52/36 370/329 |
| 2015/0011236 | A1* | 1/2015 | Kazmi | H04W 52/365 455/456.1 |
| 2015/0155976 | A1* | 6/2015 | Fan | H04L 1/16 714/748 |
| 2016/0043753 | A1* | 2/2016 | Jungnickel | H04L 5/0007 375/295 |
| 2016/0135191 | A1* | 5/2016 | Negus | H04B 7/10 370/329 |
| 2018/0205425 | A1* | 7/2018 | Sung | H04B 7/0626 |
| 2021/0282114 | A1* | 9/2021 | Liu | H04B 7/0695 |

\* cited by examiner

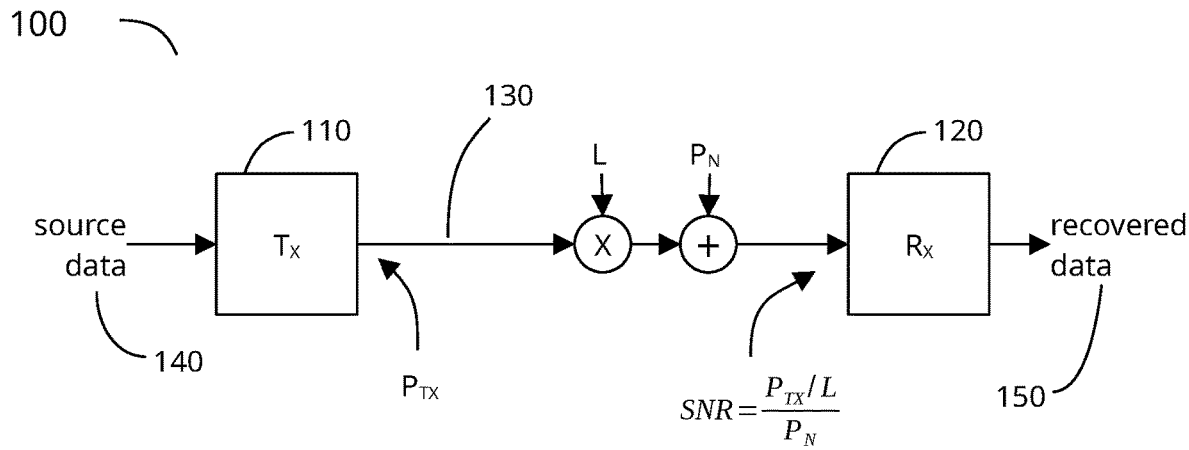
FIG. 1
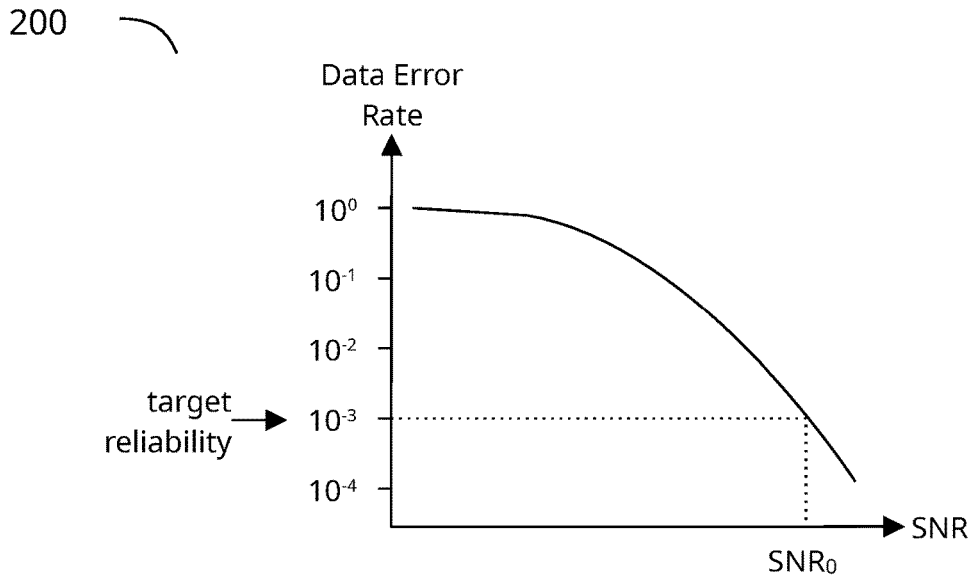
FIG. 2 - PRIOR ART
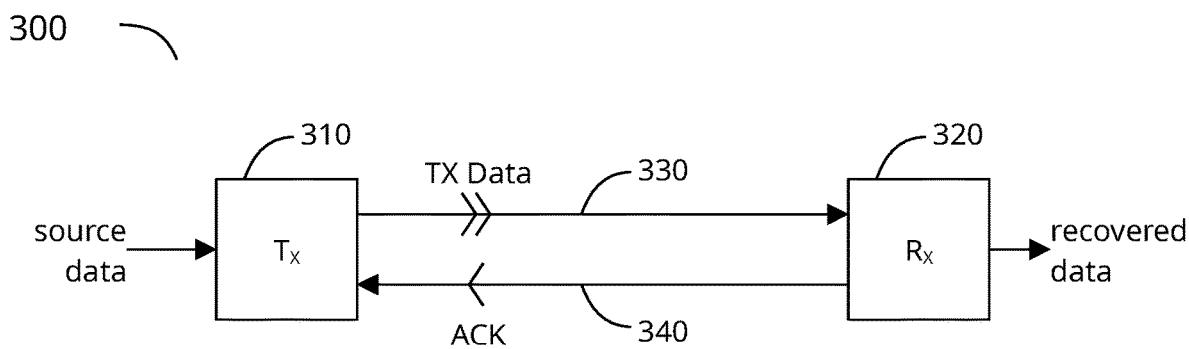
FIG. 3 - PRIOR ART

1000

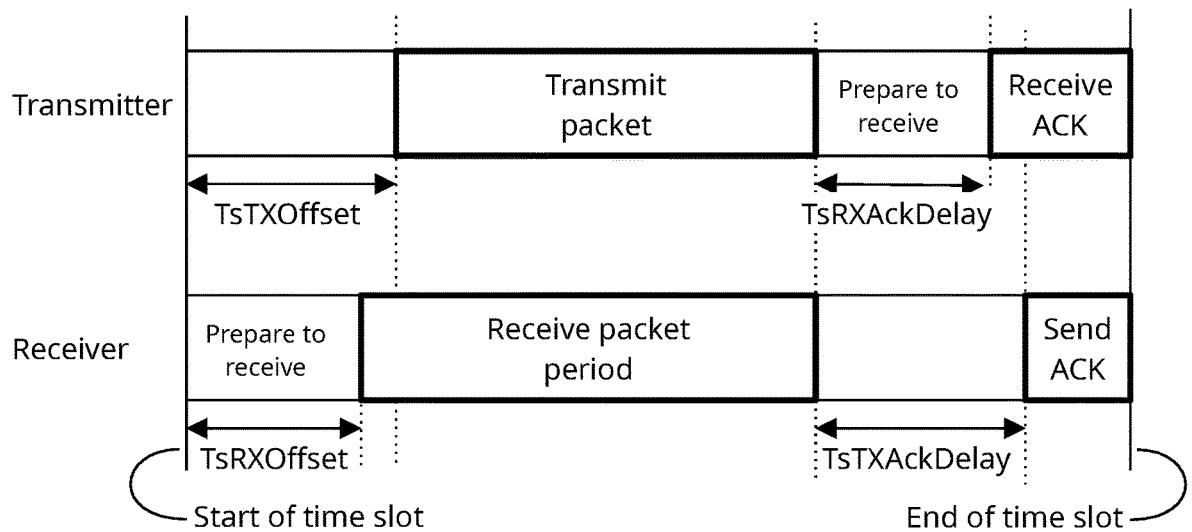

Time slot length = TsTXOffset (2ms) + TX Packet (4ms) + TsTXAckDelay (2ms) + TX Ack (1ms)

CONTEXTS FOR CHARACTERIZING AGGRESSORS AND DETERMINING SAR

(1) Analyze from receiving pilot (2) Analyze from receiving data (3) Listen only to frequency without pilot (4) Listen while receiving on different frequency or frequencies (5) Listen while transmitting on different frequency or frequencies

FIG. 11

RF MODES and DIVERSITY

TIME
- Modulation and code rate
- Scrambling permutations
- Variable data rate
- Retransmission

FREQUENCY
- RF carrier
- Baseband subcarrier

SPACE
- Path
- Polarization

1900

| ΔRSSI | ΔLQI | Aggressor code | Aggressor type | RF Mode selection |
|---|---|---|---|---|
| -1 | -1 | -4 | Obstruction | TX power ↑<br>Space div ↑ |
| 0 | -1 | -3 | Reflection | Freq div ↑<br>Space div ↑ |
| +1 | -1 | -2 | Interference | Freq div ↑<br>Update freqs |
| -1 | 0 | -1 | Noise | TX power ↑<br>Time div ↑ |
| 0 | 0 | 0 | None | No change |
| +1 | 0 | +1 | Noise | TX power ↓<br>Time div ↓ |
| -1 | +1 | +2 | Interference | Freq div ↓<br>Update freqs |
| 0 | +1 | +3 | Reflection | Freq div ↓<br>Space div ↓ |
| +1 | +1 | +4 | Obstruction | TX power ↓<br>Space div ↓ |

| Time slot | 1 | 2 | 3 | 4 | 5 | 6 | 7 | 8 | 9 | 10 |
|---|---|---|---|---|---|---|---|---|---|---|
| Aggressor type / ch. 1 | Ix | Ix | Nx | N/A | N/A | Rx | Nx | Px | Ox | N/A |
| Aggressor type / ch. 2 | Nx | Ix | Rx | Rx | Ox | Ox | Nx | N/A | Ix | N/A |
| ... | ... | ... | ... | ... | ... | ... | ... | ... | ... | ... |
| RF mode | F↑ | F↑ | P↑ | F↓ | P↓ | S↑ | T↑ | S↓ | S↑ | P↓ |
| Battery life est. (in %) | -10 | 0 | -5 | 0 | +5 | 0 | -10 | -5 | -10 | 0 |

Legend:
Ix = Interference   P = Transmission power
Nx = Noise          F = Frequency diversity
Rx = Reflection     S = Space diversity
Ox = Obstruction    T = Time diversity

FIG. 20

RF ADAPTIVE DIVERSITY AND METHOD FOR MAXIMIZING CAPACITY IN A WIRELESS TRANSMISSION

CROSS REFERENCES TO RELATED APPLICATIONS

This application claims priority from U.S. provisional patent application Ser. No. 63/165,112, entitled "Environmentally Aware Wireless Receivers and Transmitters", filed on Mar. 23, 2021, and U.S. provisional patent application Ser. No. 63/300,264, entitled "Method for Maximizing Capacity in a Wireless Transmission", filed on Jan. 18, 2022, which are hereby incorporated by reference as if set forth in full in this application for all purposes.

This application is related to the U.S. Pat. No. 10,165,531, entitled "Transmission and Reception of Signals in a Time Synchronized Wireless Sensor Actuator Network", issued on Dec. 25, 2018.

Each publication, patent, and/or patent application mentioned in this specification is herein incorporated by reference in its entirety to the same extent as if each individual publication and/or patent application was specifically and individually indicated to be incorporated by reference.

BACKGROUND

Technical Field

The disclosed implementations generally relate to systems and methods used in wireless networks and particularly to transmission and reception of signals in a time-synchronized wireless sensor actuator network where aggressors may interfere with the reception of a pristine signal. The systems and methods described herein are equally usable in wide area networks, local area networks, and personal area networks. The disclosed technology addresses the problem that communication networks resort to retransmission when data is lost due to environmental impairments. However, retransmissions are expensive in terms of bandwidth and power, and they also increase latency in the network.

Context

The subject matter discussed in this section should not be assumed to be prior art merely as a result of its mention in this section. Similarly, a problem mentioned in this section or associated with the subject matter provided as background should not be assumed to have been previously recognized in the prior art. The subject matter in this section merely represents different approaches, which in and of themselves can also correspond to implementations of the claimed technology.

Modern industrial systems often rely on automated monitoring and control of industrial assets. Those industrial assets include transportation machines (e.g., locomotives and aircraft), industrial equipment (e.g., factory machinery, mining equipment), and/or utility machines (e.g., turbines and solar farms). They may be monitored and controlled via a wireless sensor actuator network (WSAN). The WSAN comprises various networked devices including sensors, actuators, routers, and gateways. Sensors monitor operational parameters of the assets including temperature, pressure, flow, vibration, etc. The sensors can be positioned to collect the operational parameters and send corresponding signals to the gateway, via any intermediate routers. The gateway may receive the signals from the sensors, analyze the signals and then send, via the routers, control signals to the actuators, e. g., servos or motors. The control signals sent to the actuators may cause an operating condition, e.g., a valve position or engine speed, on the industrial asset to be adjusted, thereby assuring optimal system performance.

Environmental conditions may, literally, interfere with data transmission, resulting in loss of data. Traditionally, loss of data is countered by retransmitting a packet that was not or not sufficiently well received. Retransmission introduces latency, which is conventionally countered by employing higher data rates. However, higher data rates degrade reliability and increase power consumption.

One of the inventors has previously described a time-synchronized wireless network in U.S. Pat. No. 10,165,531, entitled "Transmission and Reception of Signals in a Time-Synchronized Wireless Sensor Actuator Network". The present technology provides transmitters and receivers optimized for working in time-synchronized sensor actuator networks.

Wireless providers typically discuss the bandwidth of a channel they offer. However, for a user the bandwidth is not the most important. A user may rather be interested in the data capacity at his or her disposal. The data capacity is limited by bandwidth, but also by other factors, particularly interference by various aggressors. Interference may include noise from various sources (thermal noise in the receiver's circuits, cosmic noise), electromagnetic interference (electric and electronic equipment, weather events, unwanted radio transmissions in overlapping or adjacent frequency bands), fading, and other phenomena. Whereas it is possible to indiscriminately label these different aggressors as noise, and calculate a signal to noise ratio, the signal to noise ratio gives little direction on how to improve the capacity.

SUMMARY

Various environmental conditions may, literally, interfere with wireless data transmission, resulting in loss of data. Traditionally, loss of data is countered by retransmitting a packet that was not or not sufficiently well received. Retransmission introduces latency, which is conventionally countered by employing higher data rates. However, higher data rates degrade reliability and increase power consumption.

In a first aspect, an implementation provides a wireless transmitter. The wireless transmitter includes multiple RF transmitters that are configurable for one or more PHY parameters, an RF receiver, operative to receive an ACK signal, and a processor, coupled with the multiple RF transmitters and coupled with the RF receiver. The processor makes the wireless transmitter perform the following steps.
  (A) at a data input, the implementation receives a framed data packet that includes first PHY parameters in a frame comprising payload data
  (B) the implementation determines if the ACK signal includes data specifying an RF mode and diversity information;
  (C) upon determining that the received ACK signal comprises data specifying an RF mode including diversity information:
    (i) the implementation determines second PHY parameters in accordance with the RF mode and the diversity information.
    (ii) the implementation replaces the first PHY parameters in the framed data packet with the second PHY parameters.

(iii) the implementation activates a first number of the multiple RF transmitters in accordance with the diversity information and deactivating other RF transmitters.

(iv) the implementation forwards the frame to the first number of the multiple RF transmitters.

(v) the implementation configures the first number of the multiple RF transmitters in accordance with the second PHY parameters.

In a second aspect, an implementation provides a wireless receiver. The wireless receiver includes multiple RF receivers that are configurable for one or more PHY parameters, an RF transmitter, operative to transmit an ACK signal, and a processor coupled with the multiple RF receivers and coupled with the RF transmitter. The processor makes the wireless receiver perform the following steps.

(A) the implementation configures a first number of the multiple RF receivers with first PHY parameters, in accordance with first diversity settings included in a first RF mode;

(B) the implementation uses a second number of the multiple RF receivers, including the first number of the multiple RF receivers, to receive a respective second number of copies of a framed data packet, wherein the second number matches a number of used diversity channels;

(C) for at least part of the second number of the multiple RF receivers, the implementation determines a current reception condition and predicting a future reception condition, wherein determining the current reception condition includes characterizing a dominant aggressor;

(D) based on the predicted future reception condition, the implementation updates the first diversity settings to second diversity settings, and including the second diversity settings in a second RF mode;

(E) the implementation includes data specifying the second RF mode in an ACK signal; and (F) the implementation forwards the ACK signal to the RF transmitter.

Characterizing the dominant aggressor may include digitally filtering each an RSSI and an LQI over two or more time slots, and using one or more values obtained in the digital filtering to identify an aggressor type.

Determining the individual SAR may include: receiving a first number of data packets; from among the first number of data packets, counting a second number of data packets that were received free of impairments; from among the first number of data packets counting a third number of data packets that were received with impairments for which an individual dominant aggressor has been determined; and calculating an individual SAR by dividing the second number by the third number.

Updating the first diversity settings to second diversity settings may include: changing a power level in response to a predicted change in noise and in response to a predicted change in obstruction; changing a time diversity in response to a predicted change in burst noise or burst interference; changing a frequency diversity in response to a predicted change in interference; and changing a space diversity in response to a predicted change in reflection and/or in response to a predicted change in obstruction.

An implementation may receive a pristine signal affected by one or more aggressors; from among the one or more aggressors, determine a dominant aggressor by comparing individual signal-to-aggressor ratios of at least part of the one or more aggressors; and compensate the pristine signal affected by the one or more aggressors by applying the dominant aggressor to obtain an approximation of the pristine signal.

In a third aspect, an implementation may provide a system for aggressor characterization and channel prediction. The system includes a received signal strength indicator (RSSI) input; a link quality indicator (LQI) input; an RSSI differentiator with an input coupled with the RSSI input; an LQI differentiator with an input coupled with the LQI input; a current channel lookup table (LUT) with a first partial address input coupled with an output of the RSSI differentiator and a second partial address input coupled with an output of the LQI differentiator; a first sample rate multiplier with a first input configured to receive a sample rate value, and a second input coupled with the RSSI differentiator output; a second sample rate multiplier with a first input configured to receive the sample rate value, and a second input coupled with the LQI differentiator output; an RSSI adder with an input coupled with the RSSI input and an input coupled with an output of the first sample rate multiplier; an LQI adder with an input coupled with the LQI input and an input coupled with an output of the second sample rate multiplier; an RSSI prediction differentiator with an input coupled with an output of the RSSI adder; an LQI prediction differentiator with an input coupled with an output of the LQI adder; and a predicted channel LUT with a first partial address input coupled with an output of the RSSI prediction differentiator and a second partial address input coupled with an output of the LQI prediction differentiator. The current channel LUT is configured to output a current channel condition value based on signal values on its first partial address input and its second partial address input. The predicted channel LUT is configured to output a predicted channel condition value based on signal values on its first partial address input and its second partial address input.

In a fourth aspect, an implementation provides a method for backward-compatible transmission of data packets, comprising: in a first transceiver, listening for an acknowledgement (ACK) signal from a second transceiver during a receive ACK period, wherein the first transceiver includes multiple RF transmitters and an RF receiver; determining if a prior transmission of a data packet at a head of a transmit queue was successfully received; upon determining that the prior transmission of the data packet at the head of the transmit queue was successfully received, removing the data packet from the transmit queue; determining if the transmit queue is empty; upon determining that the transmit queue is empty, ending the method; upon determining that the transmit queue is not empty, proceeding with a next data packet at the head of the transmit queue; determining if the ACK signal has been received; upon determining that the ACK signal has been received, determining if the ACK signal includes an RF mode that comprises diversity information; upon determining that no ACK signal has been received or upon determining that an ACK signal has been received that does not include an RF mode, transmitting the data packet at the head of the transmit queue using a conventional mode during a transmit packet period; and upon determining that the ACK signal has been received and that the ACK signal includes an RF mode, transmitting the data packet at the head of the transmit queue using information from the RF mode during the transmit packet period.

Transmitting the data packet at the head of the transmit queue using the conventional mode comprises may use a default packet frame from a MAC.

Transmitting the data packet at the head of the transmit queue using the information from the RF mode may comprise: replacing a first PHY information from a default packet frame by a second PHY information based on the diversity information; and activating and setting transmit frequencies for a first number of the multiple RF transmitters specified in the RF mode and deactivating any other RF transmitters.

In a fifth aspect, an implementation provides a method for backward-compatible reception of data packets, comprising: in a second transceiver, determining if reception from a first transceiver will be in a compatible mode, wherein the second transceiver includes multiple RF receivers and an RF transmitter; upon determining that the reception from the first transceiver will be in the compatible mode, activating and setting a receive frequency of one of the multiple RF receivers; upon determining that the reception from the first transceiver will not be in the compatible mode, activating and setting receive frequencies and diversity reception parameters for a first number of the multiple RF receivers specified in a first RF mode; listening, at a first frequency, for a transmitted data packet during a receive packet period; after the receive packet period, determining if reception was in the compatible mode, and determining if the transmitted data packet was successfully received; upon determining that reception was in the compatible mode and that the transmitted data packet was successfully received, sending a first acknowledgement (ACK) signal using the RF transmitter; upon determining that reception was in the compatible mode and that the transmitted data packet was not successfully received, waiting for a next timeslot and repeating the method; and upon determining that reception was not in the compatible mode, analyzing a signal-to-aggressor ratio in a first diversity channel, predicting a channel condition, and replacing the first RF mode by a second RF mode including diversity information based on the predicted channel condition, including the second RF mode in a second ACK signal, and sending the second ACK signal using the RF transmitter.

Determining if reception from the first transceiver will be in the compatible mode may be based on prior received data.

Determining if reception from the first transceiver will be in the compatible mode may be based on a prediction of channel conditions.

Determining if reception from the first transceiver will be in the compatible mode may be based on knowledge of the first transceiver.

Analyzing a signal-to-aggressor ratio in the first diversity channel may include an analysis of a received pilot in the first diversity channel.

Analyzing a signal-to-aggressor ratio in the first diversity channel may include an analysis of received data in the first diversity channel.

Analyzing a signal-to-aggressor ratio in the first diversity channel may include listening to the first diversity channel without a pilot.

Analyzing a signal-to-aggressor ratio in the first diversity channel may include listening to a second diversity channel.

Analyzing a signal-to-aggressor ratio in the first diversity channel may include listening to the first diversity channel while transmitting in a second diversity channel.

In a sixth aspect, an implementation provides a method for determining an RF mode when multiple considered diversity channels are available, the method comprising: for each considered diversity channel, determining a priority metric, a cost factor, and a link quality; ordering, in a priority list, the considered diversity channels according to their priority metric; determining a target combined link quality; and searching for a subset of the considered diversity channels that meet the target combined link quality to determine the RF mode.

Searching for the subset of the considered diversity channels may comprise a linear search. The linear search may comprise: (i) starting with an empty subset; (ii) searching, in an order of the priority list, for a first considered diversity channel that jointly with considered diversity channels in the subset meets the target combined link quality, and keeping track of a second considered diversity channel with a highest link quality; (iii) upon finding a first considered diversity channel, adding the first considered diversity channel to the subset, and ending the linear search; and (iv) upon not finding a first considered diversity channel, moving the second considered diversity channel to the subset, and repeating steps (ii) to (iv).

The priority metric may include an LQI. The priority metric may include an LQI divided by the cost factor.

The priority metric may include a signal-to-aggressor rate (SAR). The priority metric may include a SAR divided by the cost factor.

The priority metric may include a received signal strength indicator (RSSI). The priority metric may include an RSSI divided by the cost factor.

The priority metric may include a signal-to-noise ratio (SNR). The priority metric may include an SNR divided by the cost factor.

The cost factor may include at least one of power, latency, or transmission fees.

A further understanding of the nature and the advantages of particular implementations disclosed herein may be realized by reference of the remaining portions of the specification and the attached drawings.

BRIEF DESCRIPTION OF THE DRAWINGS

FIG. 1 illustrates a communication system and its signal-to-noise (SNR) calculation.

FIG. 2 illustrates how conventionally the transmission reliability is read from a data error rate versus the SNR.

FIG. 3 illustrates a conventional ACK-based communication system.

FIG. 10 illustrates an example generic TDMA time slot.

FIG. 11 shows contexts for characterizing aggressors and determining SAR in implementations of the technology.

FIG. 19 illustrates an example of aggressor characterization.

FIG. 20 illustrates an example channel conditions log with battery life estimation.

Figure 4:
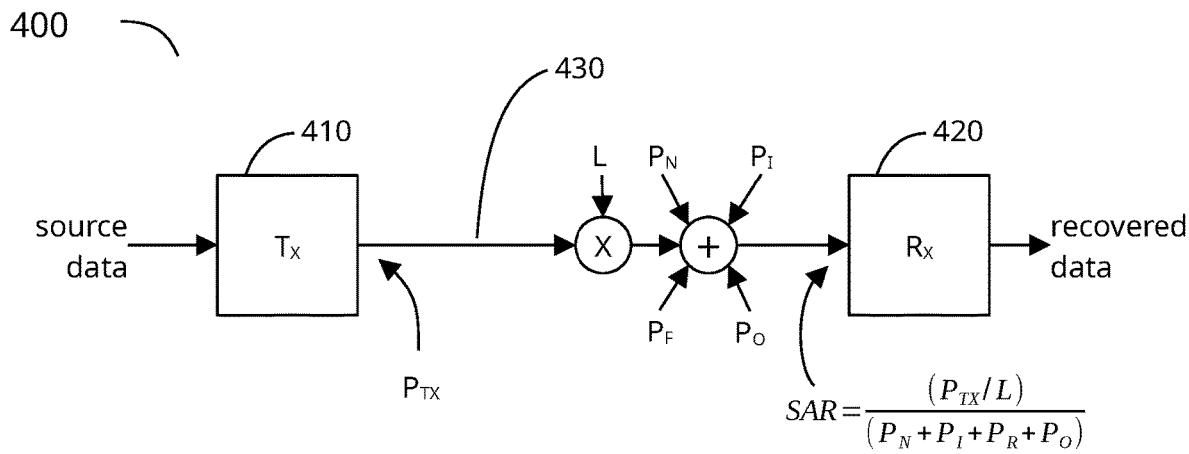
FIG. 4 illustrates an example transmission environment for implementations of the technology.

In the figures, like reference numbers may indicate functionally similar elements. The systems and methods illustrated in the figures, and described in the Detailed Description below, may be arranged and designed in a wide variety of different implementations. Neither the figures, nor the Detailed Description, are intended to limit the scope as claimed. Instead, they merely represent examples of different implementations of the technology.

DETAILED DESCRIPTION

Terminology

As used herein, the phrase "one of" should be interpreted to mean exactly one of the listed items. For example, the phrase "one of A, B, and C" should be interpreted to mean any of: only A, only B, or only C.

As used herein, the phrases "at least one of" and "one or more of" should be interpreted to mean one or more items. For example, the phrase "at least one of A, B, and C" or the phrase "at least one of A, B, or C" should be interpreted to mean any combination of A, B, and/or C.

Unless otherwise specified, the use of ordinal adjectives "first", "second", "third", etc., to describe an object, merely refers to different instances or classes of the object and does not imply any ranking or sequence.

The term coupled is used in an operational sense and is not limited to a direct or an indirect coupling. "Coupled to" is generally used in the sense of directly coupled, whereas "coupled with" is generally used in the sense of directly or indirectly coupled. "Coupled" in an electronic system may refer to a configuration that allows a flow of information, signals, data, or physical quantities such as electrons between two elements coupled to or coupled with each other. In some cases the flow may be unidirectional, in other cases the flow may be bidirectional or multidirectional. Coupling may be galvanic (in this context meaning that a direct electrical connection exists), capacitive, inductive, electromagnetic, optical, or through any other process allowed by physics.

The term connected is used to indicate a direct connection, such as electrical, optical, electromagnetical, or mechanical, between the things that are connected, without any intervening things or devices.

The terms "substantially", "close", approximately", "near", and "about" refer to being within minus or plus 10% of an indicated value, unless explicitly specified otherwise.

IC—integrated circuit—this may be a monolithically integrated circuit, i.e., a single semiconductor die that includes a circuit, or it may be a multichip module that includes multiple semiconductor dies in a single package and that may further include a substrate onto which the dies are mounted, and further electronic devices. In some implementations, an IC may include a printed circuit board with various discrete and integrated devices to jointly provide the functions as described herein.

BER—bit-error-rate

BPSK—binary phase-shift keying—a simple method for modulating digital data, capable of encoding one bit per carrier or per symbol.

Channel latency—the time span taken by a signal to travel through a channel from a transmitter to a receiver. The channel latency may, for example, be determined by a path length between the transmitter and the receiver, and the speed of light.

Diversity channel—a frequency channel with specific diversity settings. For example, in an implementation that makes available s different paths, p different power levels, and t different timing diversity settings, a frequency channel may include s×p×t diversity channels. However, when one diversity channel in a frequency channel is used, other diversity channels may be impacted or unavailable.

EMI—electromagnetic interference

Frequency channel—a communication channel for transmission of data whose frequency is fixed, but that may be used with various diversity settings.

LQI—link quality indicator—an indication of the quality of data packets received by a receiver. An LQI may be proprietary and/or prescribed by a wireless standard. It is usually expressed as an unsigned integer. For the purposes of this document, it is assumed that a higher number LQI indicates a higher quality, i.e. a lower loss of data packets.

OFDM—orthogonal frequency-division multiplexing—a method for modulating digital data onto multiple closely-spaced orthogonal subcarrier, capable of coding many bits per subcarrier and per symbol.

PER—packet-error-rate

QPSK—quadrature phase-shift keying—a simple method for modulating digital data, capable of encoding two bits per carrier or per symbol.

RF—"radio frequency" is a range of frequencies of electromagnetic signals used for transmission of radio waves, historically starting at around 20 kHz, and currently up to at least 300 GHz.

RF mode—the configuration for a collection of parallel transmitted RF signals conveying at least a part of a packet of data and providing one or more types of diversity for such parallel transmission.

RSSI—received signal strength indicator—a measurement of the power present in a received radio signal.

SAR—signal-to-aggressor ratio—the ratio of a pristine signal power to a power of an individual aggressor (the "individual SAR") or to the power of all aggressors (the "total SAR").

SNR—signal-to-noise ratio

TDMA—time-division multiple access, a channel access method for shared-medium networks that allows multiple users to share the same frequency channel by assigning successive time slots to individual users.

Transmission latency—the time span taken by a data packet to travel from a transmitter input to a receiver output, minus the channel latency. The transmission latency is determined by data handling procedures in the transmitter and the receiver, including scrambling/descrambling, error coding/decoding/correction, framing/deframing, protocol-specific wait times, retransmissions, etc.

WSAN—wireless sensor actuator network.

Introduction

Unlike traditional wireless transmission systems whose reliability is designed around a transmission channel's SNR, the disclosed technology prioritizes using multiple parallel diversity channels, continuously optimizing transmission diversity. It determines the nature and strength of any dominant aggressors impairing reliability of the available diversity channels. Based on the trend of dominant aggressors for available diversity channels, an implementation predicts upcoming channel conditions, and use the predictions to regularly update transmission diversity. As a result, implementations increase reliability while saving transmission power and minimizing transmission latency.

Implementations

FIG. 1 illustrates a communication system 100 and its signal-to-noise (SNR) calculation. A transmitter 110 communicates with a receiver 120 through a channel 130. It transmits source data 140 at a power level $P_{TX}$, and receiver 120 outputs recovered data 150 that should be identical or at least very similar to source data 140, although there may be a delay between source data 140 and recovered data 150 due to channel latency and transmission latency. Any differences other than latency are deemed data errors, and data errors may be measured in, for example, a BER or PER. Data errors are caused by a reduction between $P_{TX}$ and the received power $P_{RX}$ due to the channel loss L, where $P_{RX}=P_{TX}/L$; and by the addition of noise power $P_N$, where noise is caused by various sources of impairment, which may include thermal and other noise from the receiver itself, as they may be calculated back to the receiver input, cosmic background noise, atmospheric noise such as caused by lightning, manmade radio frequency interference, channel fading, echoes or multipath fading, linear distortions in the receiver itself, and other sources. In conventional communication systems, noise sources are usually lumped together, and their collective power $P_N$ is characterized as a stochastic signal with a probability distribution and a frequency spectrum. Thus, without fanfare, conventional analysis calculates an SNR as:

$$SNR = \frac{P_{RX}}{P_N} = \frac{\frac{P_{TX}}{L}}{P_N} \qquad (1)$$

This equation has the advantage of being simple, but the disadvantage of ignoring the causes of the noise, and the fact that the noise power $P_N$ itself can be dependent on the signal, and thus on $P_{TX}$.

FIG. 2 illustrates how conventionally the transmission reliability is read from a data error rate versus the SNR. Chart 200 shows the SNR at its horizontal axis, and the data error rate (the BER, PER, or any other metric that signifies the number of detected or estimated transmission errors) at its vertical axis. Often, the vertical axis is on a logarithmic scale. As illustrated, measurements usually indicate that at low SNR (i.e., the noise power is much larger than the signal power) all or nearly all data is received in error. With increasing SNR, the signal power becomes significant versus the noise power, and the error rate drops. To experience a data error rate that is lower than a required maximum (the worst tolerable reliability), the SNR needs to be better than a minimum $SNR_0$, or, in systems that have a target reliability, the SNR needs to be at the target $SNR_0$. When the actual SNR is lower than the target $SNR_0$, a conventional system counters the problem by increasing the number of retransmissions, which increases the transmission cost as well as the average latency.

FIG. 3 illustrates a conventional ACK-based communication system 300. This system is comparable to communication system 100, although the drawing doesn't show the noise and channel impact. Compared to communication system 100, conventional ACK-based communication system 300 has not only a forward channel 330 to transmit data from transmitter 310 to receiver 320, but also a return channel 340 to send an acknowledgement signal ACK to acknowledge reception of a transmitted data packet. When transmitter 310 receives an ACK signal, it will not retransmit a data packet as it was already correctly received. Conversely, when transmitter 310 does not receive an ACK signal, the data packet was not correctly received by receiver 320, or not received at all, or the ACK signal was lost. In those cases, transmitter 310 retransmits the data packet. In general, when $SNR>SNR_0$, there will be relatively few retransmissions. But if $SNR<SNR_0$, there may be many retransmissions. Note that when $SNR>SNR_0$, the transmission power is higher than needed to achieve the corresponding target reliability, so power savings are possible.

FIG. 4 illustrates an example transmission environment 400 for implementations of the technology. FIG. 4 introduces the notion that a received signal can be pristine, i.e., free of impairments other than channel loss and channel latency (the mere speed of the physical signal traveling from transmitter 410 to receiver 420 through channel 430). When there are impairments, even when multiple impairments are experienced at the same time, one type may be dominant or become dominant. Being able to determine the dominant type helps to proactively update the transmission configuration and parameters. Thus, an implementation recognizes multiple individual impairment types in the transmission environment 400, which may include channel latency, the channel loss L, thermal noise, interference, EMI, receiver noise, crosstalk, echo, multipath, reflections, signal dispersion, obstructions, fading, linear distortion, image signals caused by the internal architecture of a receiver or transceiver, and any other type of impairment. Some impairments may be multiplicative, others may be additive, yet others may be both additive and multiplicative. Impairments may be immediate or may include memory effects. Impairments may be single events or may have a repetitive nature, and repetitions may be regular in time, or irregular.

Transmission environment 400 also breaks with the convention to characterize the system in terms of its SNR, and instead focuses on the signal-to-aggressor ratio (SAR), where a total SAR is defined as the ratio of the pristine received signal power and the total aggressor power:

$$SAR = \frac{\text{Pristine Signal Power}}{\text{Aggressor Power}} = \frac{\text{Pristine signal power}}{(P_N + P_I + P_R + P_O)} \qquad (2)$$

wherein, for example, $P_N$ is the noise power that may combine comparable noise sources; $P_I$ is spurious power, which may combine comparable sources of interference and EMI; and $P_R$ is reflection, and $P_O$ is obstruction power, with may combine the effects on received power by all obstructions combined. The SAR is calculated for the input of receiver 420, and impairments occurring at another point are effectively calculated back towards the receiver input. An implementation may also calculate the SAR for an individual (for example, dominant) impairment. Additionally, if impairment is determined to be interference from another radio, then an implementation may determine if the other radio is internal to the network that includes transmission environment 400, or if the radio is from an unrelated source. The SAR is a metric that is calculated over time rather than instantaneously. An implementation calculates the SAR for each of at least a part of the available diversity channels.

Figure 5:
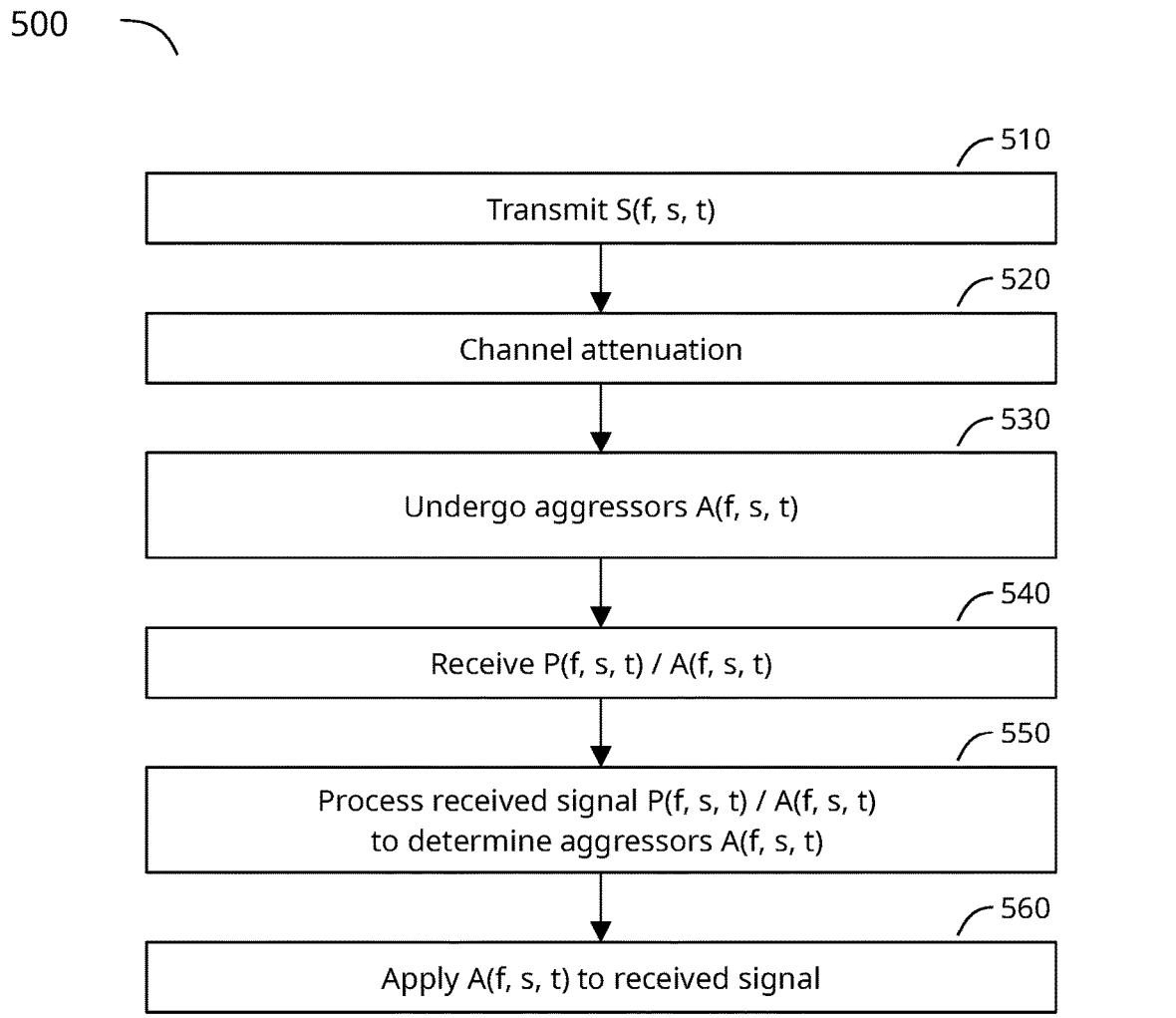
FIG. 5 illustrates a method for maximizing capacity in a wireless transmission.

FIG. 5 illustrates a method 500 for maximizing capacity in a wireless transmission. The method includes the following steps:

Step 510—transmitting an original signal S. The signal may be transmitted in one or more channels, each with a frequency band or frequency range; each channel may have a transmission power, a polarization, and certain fading characteristics; and the signal may in each channel be transmitted over a certain time period, with a certain data order. For example, a channel may be subject to frequency (f), space (s), and time (t) characteristics. Aggressors acting upon the transmissions in the one or more channels determine which parts of the signal or, in case of a digital signal, which bits will be received correctly or in error. A channel may include parts of a transmitter, a medium (which may be or include a vacuum), and parts of a receiver.

Step 520—undergoing channel attenuation. While the original signal S travels through the medium, it weakens because of channel attenuation, and arrives at the receiver antenna as a weakened but pristine signal P. The channel attenuation may depend on the shape of the medium, which in a wireless transmission also depends on characteristics of the transmission and reception antennas. For example, a transmission might be omnidirectional where the medium may be in the shape of a sphere. Or the transmission may be horizontal where the medium may have the shape of a disk. Or, the transmission may be unidirectional from a dish-shaped antenna, and the medium may have the shape of a cylinder. In the case of a spherical medium, the transmission energy spreads out over the surface area of a sphere, and so that the pristine signal P is proportional to $$\frac{S}{4\pi r^2}.$$

In the case of a disk-shaped medium, the transmission energy spreads out over the circumference of a circle, and the pristine signal P is proportional to $$\frac{S}{2\pi r^2}.$$

In the case of a cylinder-shaped medium, the pristine signal may be less dependent on the distance, although other factors may play a role. In any case, in many media, the energy density decreases with the square of the distance d, and the signal undergoes attenuation proportional with $1/d^2$.

Step 530—the channel applies aggressors to the pristine signal. An implementation views each aggressor as being multiplicative. That is, the aggressor is characterized as a divisor to the transmitted signal as it attenuates while traveling through the medium (the space). The aggressor may be subject to the frequency f, the space s, and the time t.

Step 540—receiving the pristine signal and the combined aggressors, each as a function of the frequency, the space, and the time. The average received signal across a packet, as a function of frequency f, space s, and time t, may be:

$$RX(f,s,t)=P(f,s,t)/A(f,s,t)$$

Step 550—processing the amplified received signal P(f, s, t)/A(f, s, t) to determine and/or attenuate the aggressors A(f, s, t). The implementation can find deterministic aggressor as follows. For fixed space s and frequency f, it can auto-correlate Rx(t): Rxd(t)=P/Ad(t). For fixed frequency f and time t, it can cross-correlate Rx(s): Rxd(s)=P/Ad(s). For fixed space s and time t, it can cross-correlate Rx(f): Rxd(f)=P/Ad(f). Where P may be known by design, from the above four equations, an implementation can determine Ad(s), Ad(t), and Ad(f).

The implementation can find random aggressors as follows:

$$Ar(t)=Rx(t)-Rxd(t)$$

$$Ar(s)=Rx(s)-Rxd(s)$$

$$Ar(f)=Rx(f)-Rxd(f)$$

Step 560—applying A(f, s, t) to the received signal to compensate the amplified received signal and determine an approximation of the pristine signal P(f, s, t).

An implementation transmits the transmit signal S, the original signal. It is attenuated proportional to the square of the distance to the receiver and that becomes P, the pristine signal. P is always present, even though it may be infinitely small. However, P may be impacted by aggressors. The received signal is P/A where A are aggressors that distort, diminish or add distortions and false information to the received signal. The higher the aggressor level, the lower the received power ratio P/A. To recover P from P/A, the A function must be determined so that an inverse function can be applied to P/A. Known ways to determine A include correlating over multiple samples, controlling or preparing the environment so as to limit the magnitude and function of A, and using multiple radios to real-time sample multiple incoming P/A instances and applying diversity. As enough A is cancelled out, P can be discriminated from the received signal.

Figure 6:
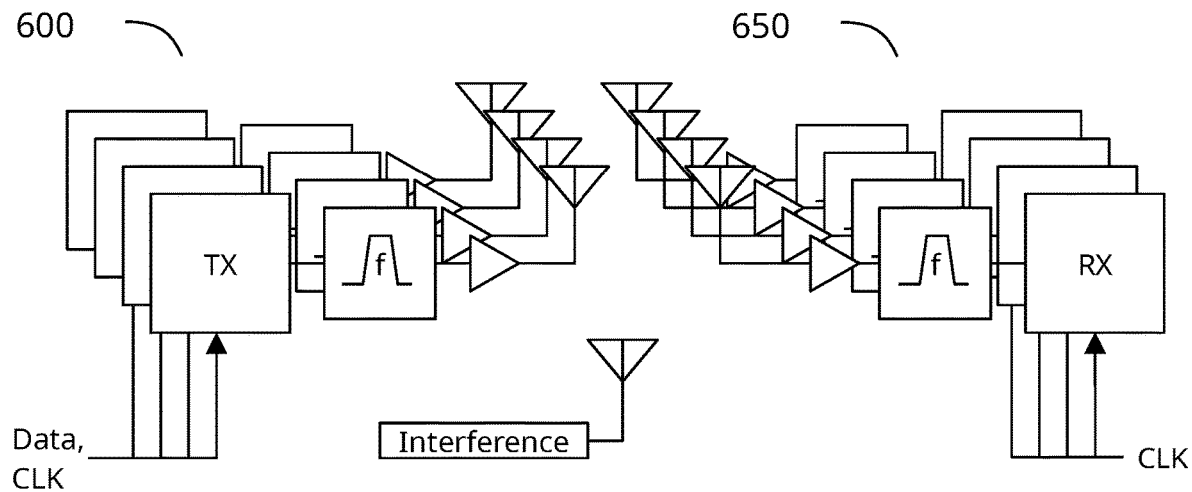
FIG. 6 illustrates how an implementation measures or determines aggressors.

FIG. 6 illustrates how an implementation measures or determines aggressors. On the transmit side, one or more transmitters transmit through one or more antennas (not necessarily the same number) into multiple channels. On the receive side, one or more receivers receive through one or more antennas (not necessarily the same number) from the multiple channels. While there is one transmit data, being transmitted over the multiple channels, the one or more receivers receive multiple receive signals (one for each of the multiple channels). Each of those includes a pristine signal, and all pristine signals carry the same transmit data. However, the multiple channels may be impacted by different aggressors, and thus the received signals are not identical. An implementation may determine the aggressors by correlating the multiple receive signals.

Figure 7:
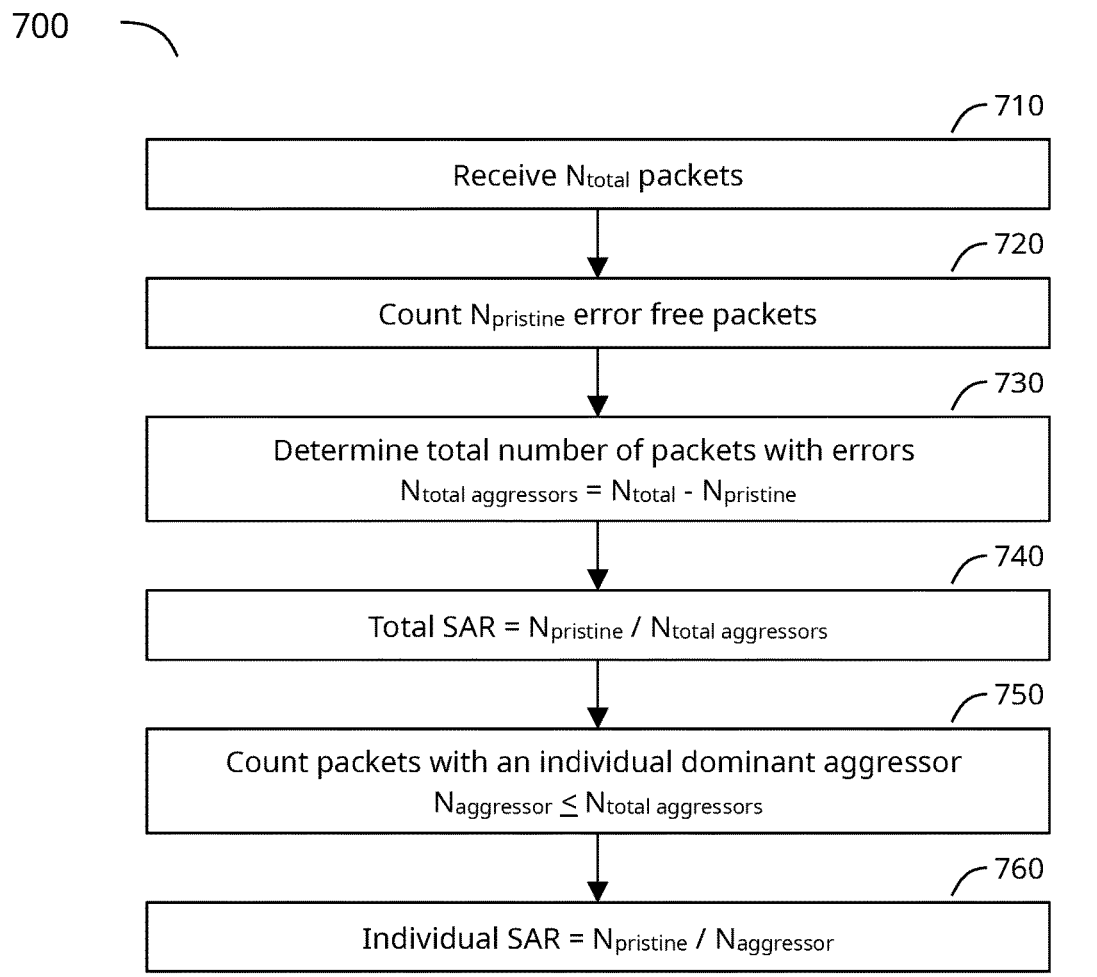
FIG. 7 illustrates an example method for determining total SAR and individual SAR.

FIG. 7 illustrates an example method 700 for determining total SAR and individual SAR. Method 700 calculates the SAR for a single diversity channel, and comprises the following steps.

Step 710—receiving a first number ($N_{total}$) of data packets.

Step 720—from among the first number of data packets, counting a second number ($N_{pristine}$) of data packets that were received free of errors. An implementation may determine that a data packet is error free based on inspection of the reception result of a pilot included with the data packet. A pilot has known content, and therefore the implementation can compare the reception result with the known content, and determine that they are equal. Further implementations may take into account whether correct reception of a data packet required using its modulation redundancy (code rate) and/or error correction. Some implementations may use the LQI, other implementations may use any combination of information contained in the LQI and knowledge about results of the demodulation and error correction process.

Step 730—determining a third number of data packets ($N_{total\ aggressors}$) that were received with errors by subtracting the second number from the first number. An implementation may determine that a data packet was received with errors based on inspection of the reception result of a pilot included with the data packet. A pilot has known content, and therefore the implementation can compare the reception result and the known content, and determine that they are unequal. Further implementations may take into account whether correct reception of a data packet required using its modulation redundancy (code rate) and/or error correction. Some implementations may use the LQI, other implementations may use any combination of information contained in the LQI and knowledge about results of the demodulation and error correction process.

Step 740—calculating a total SAR by dividing the second number by the third number. Thus, $$\text{Total } SAR = \frac{N_{pristine}}{N_{total\ aggressors}} \quad (3)$$

Step 750—counting a fourth number of data packets ($N_{aggressor}$), that were received with errors for which an individual dominant aggressor has been determined.

Step 760—calculating an individual SAR by dividing the second number by the fourth number. Thus, $$\text{Individual } SAR = \frac{N_{pristine}}{N_{aggressor}} \quad (4)$$

FIG. 7 gives an example of one implementation, but other implementations are equally within the ambit and scope of the technology. For example, an implementation may count the number of data packets received with an error ($N_{total\ aggressors}$), and calculate the number of pristine data packets by subtracting $N_{total\ aggressors}$ from $N_{total}$. Some implementations may calculate only the SAR for individual aggressors and skip calculating the total SAR. Any other variation is also possible.

Figure 8:
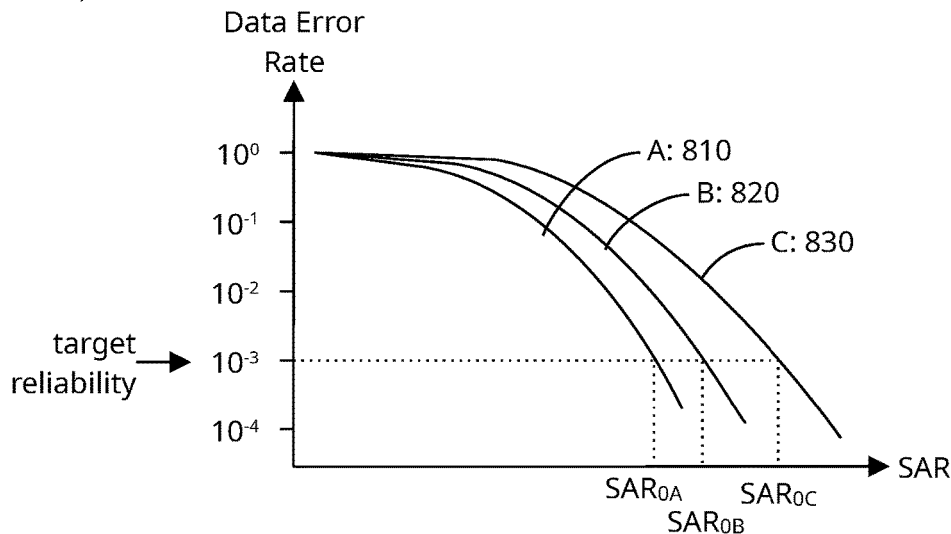
FIG. 8 redefines transmission reliability.

FIG. 8 redefines transmission reliability. FIG. 8 shows chart 800, which measures the data error rate against the SAR for multiple available diversity channels. In this example, three diversity channels are shown (diversity channels A, B, and C), but many more diversity channels may be available. The data error rate for diversity channel A is measured, calculated, or simulated in curve A 810. The data error rate for diversity channel B is, similarly, given in curve B 820. The data error rate for diversity channel C is given in curve C 830. To achieve a target reliability (the example in the figure has a target reliability corresponding with a data error rate of $10^{-3}$ or one in one thousand), diversity channel A must be operated at $SAR_{OA}$; diversity channel B must be operated at $SAR_{OB}$; and diversity channel C must be operated at $SAR_{OC}$. An implementation may increase a frequency channel's SAR by increasing the transmit power $P_{TX}$ (i.e., even though the implementation uses the same frequency channel, it uses a different diversity channel). Where and when needed, and if possible, an implementation may use parallel diversity channels to transmit a data packet rather than having to retransmit the data packet. This helps ensure that the system remains working at a low system latency. Also, in clean environments, operation is possible at optimum transmission power.

Figure 9:
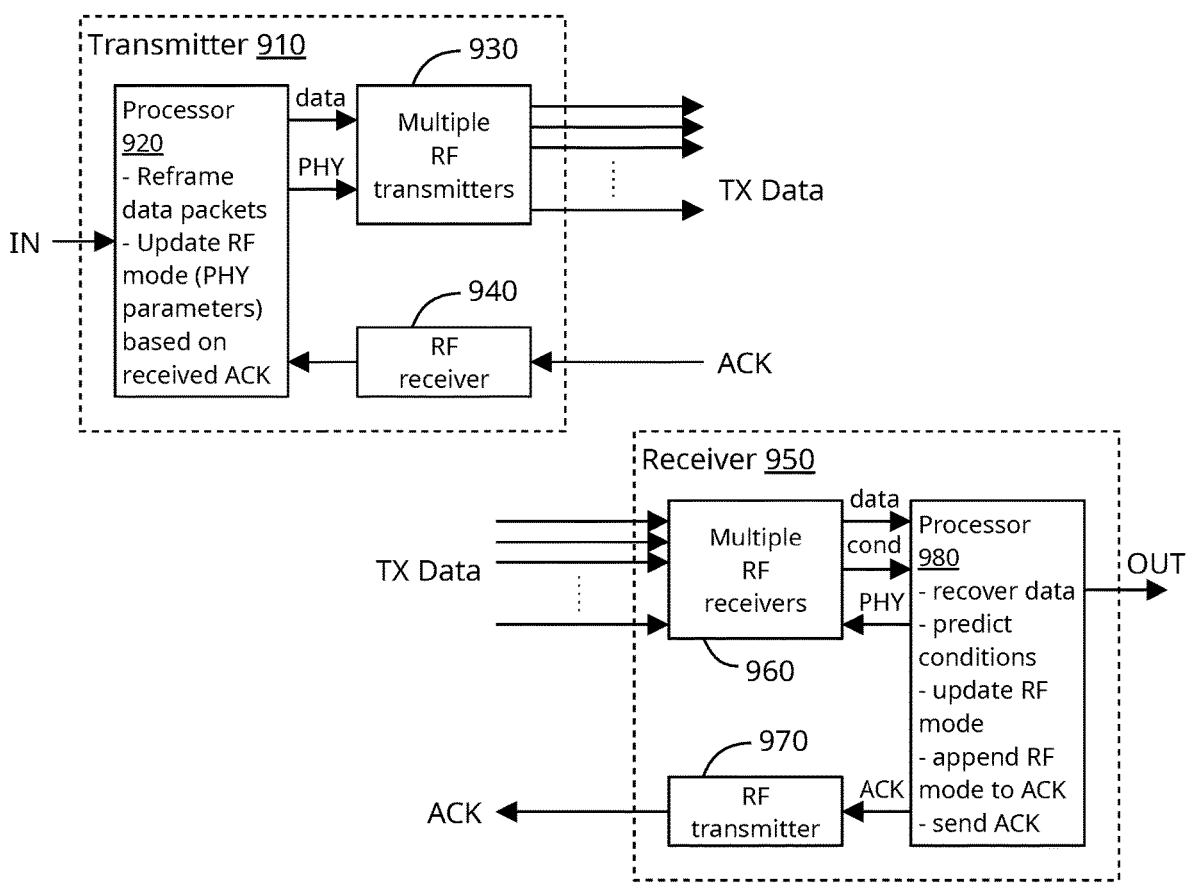
FIG. 9 illustrates an example communication system.

FIG. 9 illustrates an example communication system 900. Communication system 900 includes transmitter 910 and receiver 950. Transmitter 910 receives a framed data packet at its input, for example from a MAC. The framed data packet may include a frame with PHY parameters determined by the MAC, one or more pilots, and payload (the data packet itself). Transmitter 910 may reframe the data packet by replacing the PHY parameters from the MAC with PHY parameters determined from a first RF mode with first diversity settings, and transmit the reframed data packet via one or more of multiple available diversity channels to receiver 950, which recovers the payload data and outputs it. Receiver 950 also analyzes reception conditions in the used diversity channels, and predicts what their reception conditions are likely to be for a next time slot. Based on the predicted reception conditions, receiver 950 determines a second RF mode with second diversity settings, and communicates the second RF mode to transmitter 910 by sending an ACK signal that includes the second RF mode.

In some implementations, transmitter 910 may not receive a framed data packet at its input, but simply a payload. In those implementations, transmitter 910 does not reframe the data packet, but creates the correct frame directly.

Any of the used diversity channels may need unique PHY parameters. Thus, an implementation may reframe or frame the data packet multiple times, as needed for transmission via each of the used diversity channels.

Transmitter 910 may include a processor 920, multiple RF transmitters 930, and at least one RF receiver 940. Processor 920 determines PHY parameters for a first number of used RF transmitters of the multiple RF transmitters 930 based on the first diversity settings from the first RF mode. Each of the used RF transmitters is configurable for the PHY parameters, including two or more transmission power levels. Each of the used RF transmitters transmits via one or more of the diversity channels specified in the first RF mode, in such a way that all specified diversity channels are covered by exactly one used RF transmitter. Processor 920 reframes the framed data packet (or newly frames an unframed data packet) as needed for the specified diversity channels and the used RF transmitters, and forwards the reframed or newly framed data packet to the used RF transmitters. Processor 920 may also provide power management for the multiple RF transmitters 930 by activating the used RF transmitters and deactivating unused RF transmitters. It configures the used RF transmitters with the appropriate respective PHY data, and controls sending the reframed or newly framed data packet by the used RF transmitters in accordance with the timing allowed within a time slot. Upon receiving an ACK signal from receiver 950 in the at least one RF receiver 940, processor 920 determines if the received ACK signal includes data specifying the second RF mode, reads the second RF mode with the second diversity settings from the ACK signal and prepares for transmitting a next data packet according to the second diversity settings via a second number of used RF transmitters of the multiple RF transmitters 930. In some implementations, processor 920 may store dominant aggressors and RF modes for transmitted data packets in memory, thus creating a log of transmitter 910's performance in the environment. It may obtain this information from the successively received ACK signals, whenever available.

Receiver 950 may include multiple RF receivers 960, at least one RF transmitter 970, and a processor 980. Processor 980 prepares a first number of used RF receivers (which may be equal to the first number of used transmitters in transmitter 910) for receiving the data packet from transmitter 910 by configuring their PHY parameters in accordance with the first diversity settings in the first RF mode. In addition to receiving multiple copies of the data packet (in accordance with the number of used diversity channels), it also receives reception conditions from the used RF receivers, for example including LQI and RSSI parameters. Processor 980 recovers the data packet, and predict reception conditions for receiving the next data packet. Based on the predicted reception conditions, processor 980 determines second diversity settings and includes the second diversity settings in the second RF mode, which it appends to the ACK signal. It forwards the ACK signal to the at least one RF transmitter 970, and controls its transmission in accordance with the timing allowed within the time slot. Processor 980 may store dominant aggressors and RF modes of prior data packets and the current data packet in memory. It may further include information about the dominant aggressors in the ACK signal.

Processor 920 and processor 980 may each include a programmable processor executing software or firmware instructions, and/or one or more digital signal processors, combinatorial logic, timing circuits, memories, and power management circuits.

Multiple RF transmitters 930 are operable to transmit data packets in accordance with the first RF mode and the second RF mode. The first diversity settings and the second diversity settings may dictate diversity in one or more dimensions, as further described with reference to FIGS. 12 and 13. Each of the multiple RF transmitters 930 may include at least part of an individual RF transmit stage, where an RF transmit stage includes elements commonly found in RF transmit stages, such as a digital-to-analog converter, one or more filters, one or more mixers, an oscillator that may be programmable or an oscillator with a programmable frequency synthesizer, a power amplifier, and an antenna that may or may not be polarized. Multiple RF receivers 960 are operable to receive data packets in accordance with the first RF mode and the second RF mode. Each of the multiple RF receivers 960 may include at least part of an individual RF receive stage, where an RF receive stage includes elements commonly found in RF receive stages, such as an antenna that may or may not be polarized, a low-noise amplifier, one or more mixers, an oscillator that may be programmable or an oscillator with a programmable frequency synthesizer, one or more filters, and an analog-to-digital converter. When operational, communication system 900 at any one time may transmit data via one or multiple diversity channels, where each diversity channel may be between an individual RF transmit stage and an individual RF receive stage. Each diversity channel has characteristics different than all other channels, thus providing diversity to the data transmission. The diversity is defined by the current RF mode, and the implementation updates the RF mode regularly, for example once per data packet, to be optimally configured for expected channel impairments, as predicted by processor 980.

FIG. 9 shows only elements and functions relevant for the disclosed technology, but actual implementations include any other functionality normally found in wireless digital communication systems, including those that touch the functionality of the blocks shown in FIG. 9 and discussed above. For example, a transmitter normally incudes an error coder that adds redundancy to data with the aim to make reception error detectable and correctable, and a receiver normally includes an error detection and correction block. An implementation can receive data with errors, detect and correct the errors, and handle the corrected data as if it had been received error free. It can update the RF mode and send the ACK message to transmitter 910.

Further implementations may send an ACK message after receiving data with errors that were not possible to correct. In this case, the ACK message signals to the transmitter that data was not recovered, and it may also include an update to the RF mode.

The at least one RF receiver 940 receives the ACK message from receiver 950, and determines from the ACK message if and how the RF mode must be updated. Whenever the RF mode is updated, it configures processor 920 and multiple RF transmitters 930 accordingly in preparation for transmission of a next data packet. When the at least one RF receiver 940 does not receive an expected ACK message, TX data has been lost or has otherwise not been successfully received, and transmitter 910 retransmits the data.

FIG. 9 shows an example implementation, but the functionality discussed above may be distributed over different architectural blocks than those shown in FIG. 9. Different architectures providing the functionality discussed above and elsewhere in this document all fall within the ambit and scope of the technology. Furthermore, the described or different architectural blocks may also provide any other functionality described in this document and pertaining to the disclosed technology, and any other functionality that may be found in wireless transmitters and receivers.

FIG. 10 illustrates an example generic TDMA time slot 1000. The time slot may be an interval of time, e.g., between a start of time slot and end of time slot when a device may transmit or receive a signal. During transmission, a transmitter may send a signal, e.g., transmit packet, to a receiver after a TsTXOffset. The TsTXOffset may include a startup time for the transmitter. Time slot 1000 may be long enough for the transmitter to receive an acknowledgement ACK during a receive ACK period. The receive ACK may be received after a TsRXAckDelay which may include a timespan associated with preparation by the transmitter to receive the receive ACK. Similarly, in the same time slot and in parallel with the transmission, a receiver may receive the signal, i.e., the transmit packet, during a receive packet period, and then send the acknowledgment ACK before the end of time slot. Typically, the receive packet period starts before the transmit packet is transmitted. This time is indicated by TsRXOffset, which may be shorter than the TxTXOffset. Similarly, the receive ACK period starts before the acknowledgment ACK is transmitted, and the TsRXAckDelay may be shorter than TsTXAckDelay. Timing of transmission and/or reception in a time slot may take other forms as well. Although FIG. 10 depicts the end of the ACK signal send and receive periods coinciding with the end of the time slot, some implementation may have a guard band time after the end of the ACK signal. Further, some implementations may continue receiving data and/or ACK signals until after the end of the allowed transmit time, to have a guard band time margin and ensure complete reception of a signal.

FIG. 11 shows contexts 1100 for characterizing aggressors and determining SAR in implementations of the technology. An implementation determines and characterizes any dominant aggressor for at least part of all available diversity channels, and keeps track of changes in the dominant aggressor to be able to effectively cope with expected channel conditions. For relatively slow changes in a dominant aggressor, an implementation can simply extrapolate conditions during an upcoming time slot, and/or use numerical integration methods such as forward Euler (explicit Euler), backward Euler (implicit Euler), and trapezoidal, or linear multistep methods such as Gear, Adams-Bashford, Adams-Moulton, and any other predictor-corrector methods known in the art. For relatively fast changes, an implementation may track statistics, such as for strong dominant aggressors that occasionally badly impair a channel's transmission during a period that is shorter than 3 time slots, and predict changes in those occasional dominant aggressors. Some implementations may track changes both in a channel's slow-changing dominant aggressor and in the channel's one or more fast-changing occasional dominant aggressors. For each dominant aggressor, an implementation attempts to determine its nature or type, such as noise, interference, reflection, obstruction, or any other source of impairment. The implementation uses the type of aggressor to determine an appropriate change in diversity to mitigate the aggressor's effects. For example, in case a diversity channel has an occasional dominant aggressor with a one time slot duration, then the implementation may replace the diversity channel with another diversity channel that offers more, or different, time diversity.

Contexts 1100 lists five different situations in which an implementation may work to characterize a channel. In a first situation, an implementation receives a pilot, and the implementation uses the pilot to determine channel conditions. The pilot has known content, and from a comparison between the received pilot content and a stored copy of the correct pilot content, the implementation characterizes the channel. Some implementations rely on the LQI and RSSI to characterize the channel, other implementations take further information into account, such as from the demodulation process. In a second situation, an implementation may use the received content of a data packet to characterize the data. After using redundancy from the demodulation process (e.g., the code rate) and performing error correction from a CRC or any other error code, the implementation may compare the received raw content of the data packet with the successfully error-corrected data packet, and characterize the channel conditions based on the comparison. Further implementations may compare the received raw content of the data packet with a successfully error-corrected data packet version received via any or multiple other diversity channels, and determine the channel conditions.

In a third situation, an implementation may listen only to a channel. For example, a frequency channel or diversity channel that is not currently used for transmission, but may be used any time soon, can be characterized for at least some of its aggressors, such as noise and interference. If the channel hasn't been used before, the measured levels can give a first indication for required transmission parameters, for example, the transmission power to be used, and modulation and framing parameters. If the channel has been used before, the implementation can use the measured levels in combination with medium-term historical levels and results to determine optimal transmission parameters.

While listening to a channel, an implementation may determine that there is a transmission from a transmitter other than the intended transmitter. An implementation may proceed and determine if the transmission is from an in-network transmitter or an out-of-network transmitter. Upon determining that the transmission is from an in-network transmitter, the implementation blocks the channel for its own use to prevent becoming an interferer to the other in-network transmitter. Upon determining that the transmission is from an out-of-network transmitter, the implementation may use the channel as it determines appropriate for its own use, based on its further characterization of the channel.

In a fourth situation, an implementation may listen to a channel while it is also receiving data on one or more different frequencies. While on the channel itself there may still be only noise and interference, some of the interference may be due to leakage from an adjacent channel. Characterization of used channels may provide information about obstructions and reflections. Reflections can be calculated and estimated from the information in an equalizer that may be used on the other channels. Thus, the implementation may provide a channel prediction that includes measured noise and interference, and estimated impact of obstructions and reflections.

In a fifth situation, while an implementation is transmitting itself (on a different frequency), it can listen to a channel and learn even more about the aggressors, since now the implementation is an aggressor itself. Its transmission creates direct and indirect interferences on various frequencies, and energy may leak into the channel the implementation is listening to. It is quite possible that the implementation itself is the dominant aggressor, and measurements can provide a most valuable baseline for operation while receiving a wanted signal.

Measurement results in a combination of the above contexts provide an implementation even more knowledge about the channel conditions, and even better information to be able to predict channel conditions and thus determine the ideal RF mode.

Figures 12, 13:
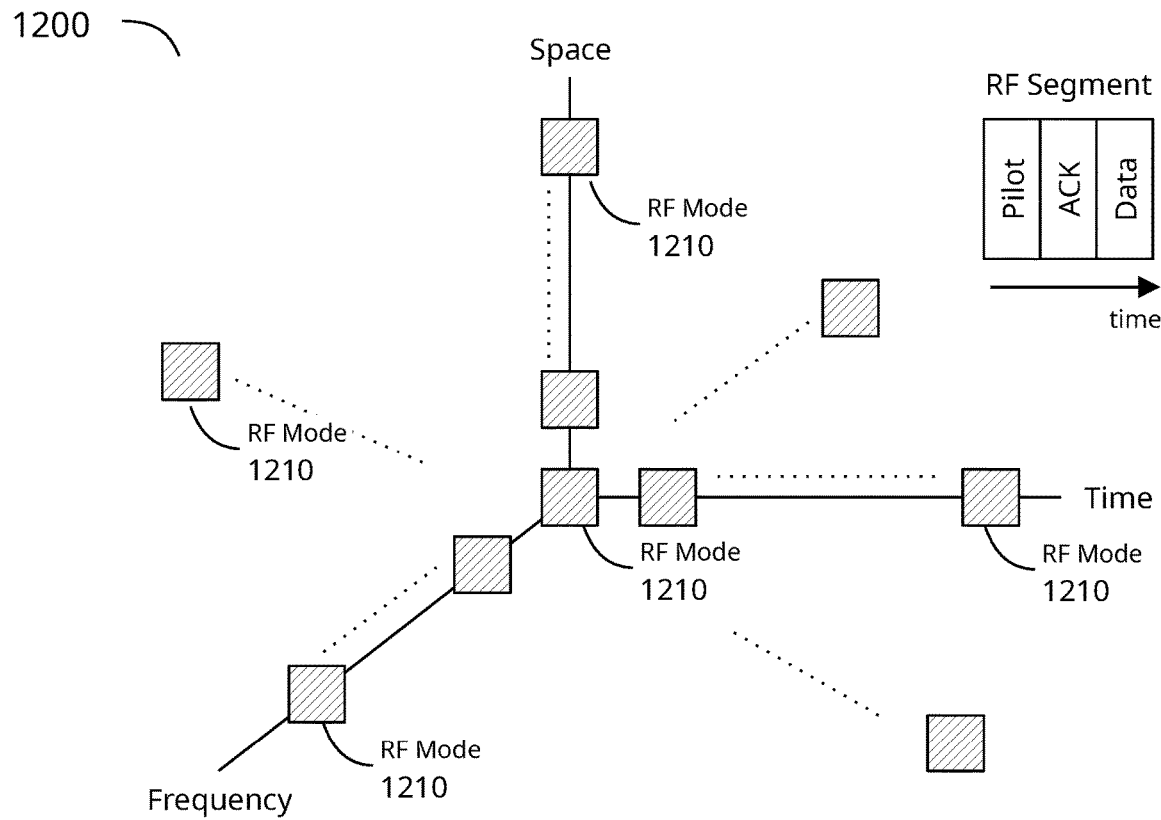
FIG. 12 illustrates an example diversity space.
FIG. 13 illustrates examples of diversity used in RF modes in implementations of the technology.

FIG. 12 illustrates an example diversity space 1200. The drawing shows a coordinate system with three axes representing three dimensions in the diversity space. Other implementations may have fewer or more dimensions. Diversity space 1200 has a first axis (or dimension) for time diversity, a second axis (or dimension) for frequency diversity, and a third axis (or dimension) for space diversity. Time diversity includes retransmission of packets, but also code diversity, time interleaving or scrambling, and any other ways of ensuring that a bit transmitted twice or more is transmitted at different instances of time. Frequency diversity includes using modulation carriers at different frequencies, and using phase diversity, and any other way of ensuring that a bit transmitted twice or more is transmitted at different frequencies. Space diversity includes transmitting data via different spaces, for example using different sets of transmit and receive antennas, using different polarizations, and any other ways of ensuring that a bit transmitted twice or more is transmitted differently through space. As far as the different methods of time diversity are orthogonal to each other, the time diversity axis may itself represent a multidimensional space. Similarly, the frequency axis and the space axis of diversity space 1200 may each represent multidimensional spaces, and therefore, even though diversity space 1200 is drawn as a three-dimensional space, FIG. 12 might represent a diversity space that has more than three dimensions. Furthermore, implementations may use different modulation methods, such as BPSK versus QPSK or any other modulation constellation, to introduce a combination of time and frequency diversity. Implementations may use independent modulators to achieve frequency diversity, or they may use a multicarrier technology, such as OFDM, to modulate multiple copies of data onto different subcarriers within a single modulation symbol.

The diversity space, for example diversity space 1200, defines all possible RF modes that are available to an implementation, and the implementation transmits (or receives) data packets organized in RF segments. An RF segment includes a pilot, followed by an acknowledgment, and then followed by data. The pilot has a structure that is known to both the transmitter and the receiver, and therefore the receiver, for example in processor 980 of FIG. 9, can compare actually received pilot data with the known structure, which enables the receiver to determine and characterize a dominant aggressor, and in general the SAR and its trend, and thus decide which RF mode 1210 from diversity space 1200 to use for the data. In some implementations, the data may include additional pilots, or patterns of known data, that can be used to characterize channel conditions.

FIG. 13 illustrates examples of diversity 1300 used in RF modes in implementations of the technology. Diversity 1300 is broadly categorized in three dimensions: time diversity, frequency diversity, and space diversity. While one way of providing time diversity is by retransmitting a message, as discussed before, this diversity affects the transmission latency, which makes it a poor choice for some applications. However, there are other forms of time diversity that do not necessarily affect latency. An implementation may use a first modulation and coding, for example, a BPSK modulation scheme with a conservative code rate of 1/2. It slowly transmits one copy of the data, and half of the transmission is redundant data that lowers the error rate, i.e., for every 128 bits of payload, 256 bits are transmitted, including 128 for coding redundancy. The data may be scrambled in time to spread the energy of burst interference (for instance, lightning). Dependent on predicted channel conditions, the implementation may switch to a second modulation and coding. For example, it could use QPSK and a code rate of 3/4. In this situation, the implementation transmits 512 bits, including 128 for coding redundancy, and 384 bits for 3 copies of the payload. The three copies of the payload may be time scrambled with different permutations, each reducing the impact of burst interference, and each being impacted differently by a burst. The second modulation and coding, by itself, provides time diversity, but it also provides time diversity when compared with the first modulation and coding. It may also provide a robustness against other channel conditions than the first modulation and coding might provide. Time diversity, in general, provides protection against burst-mode aggressors, including lightning and other events of very short duration. Burst-mode aggressors change quickly, and may occur occasionally, and at random time intervals.

Frequency diversity provides redundancy by transmitting a data packet at two or more different frequencies. Frequency diversity provides protection against aggressors that affect particular frequencies. These aggressors are often slow changing, and they may occur at random or determined frequency intervals. Because of their slow changes, these aggressors are relatively easy to predict, and implementations can be highly effective and efficient in mitigating their effects. Frequency diversity doesn't necessarily imply that a different channel must be selected for parallel transmission. For example, a multicarrier modulation system such as OFDM can be highly efficient in using the available bandwidth in an available channel, yet offer frequency diversity by using multiple different sets of subcarriers to provide frequency diversity.

Space diversity provides redundancy by transmitting a data packet, potentially at the same time and the same frequency, via two different paths in space. This can be obtained, for example, by using multiple transmission antennas, multiple reception antennas, different polarizations, beam forming, transmitting via reflectors, and any other method known in the art. Space diversity provides protection against aggressors that have a fixed location in space.

An implementation may provide diversity in any of the three described dimensions, time, frequency, and space, or in any combination of these dimensions, or in any other dimension conceivable. Particularly, since transmission may not use electromagnetic waves but another physics effect, other diversity dimensions may exist. Some diversity techniques impact multiple dimensions, such as modulation diversity, where modulation might involve both the time and the frequency dimensions. Other techniques may be part of an RF mode, but not necessarily impact diversity, like the transmission power.

Figure 14:
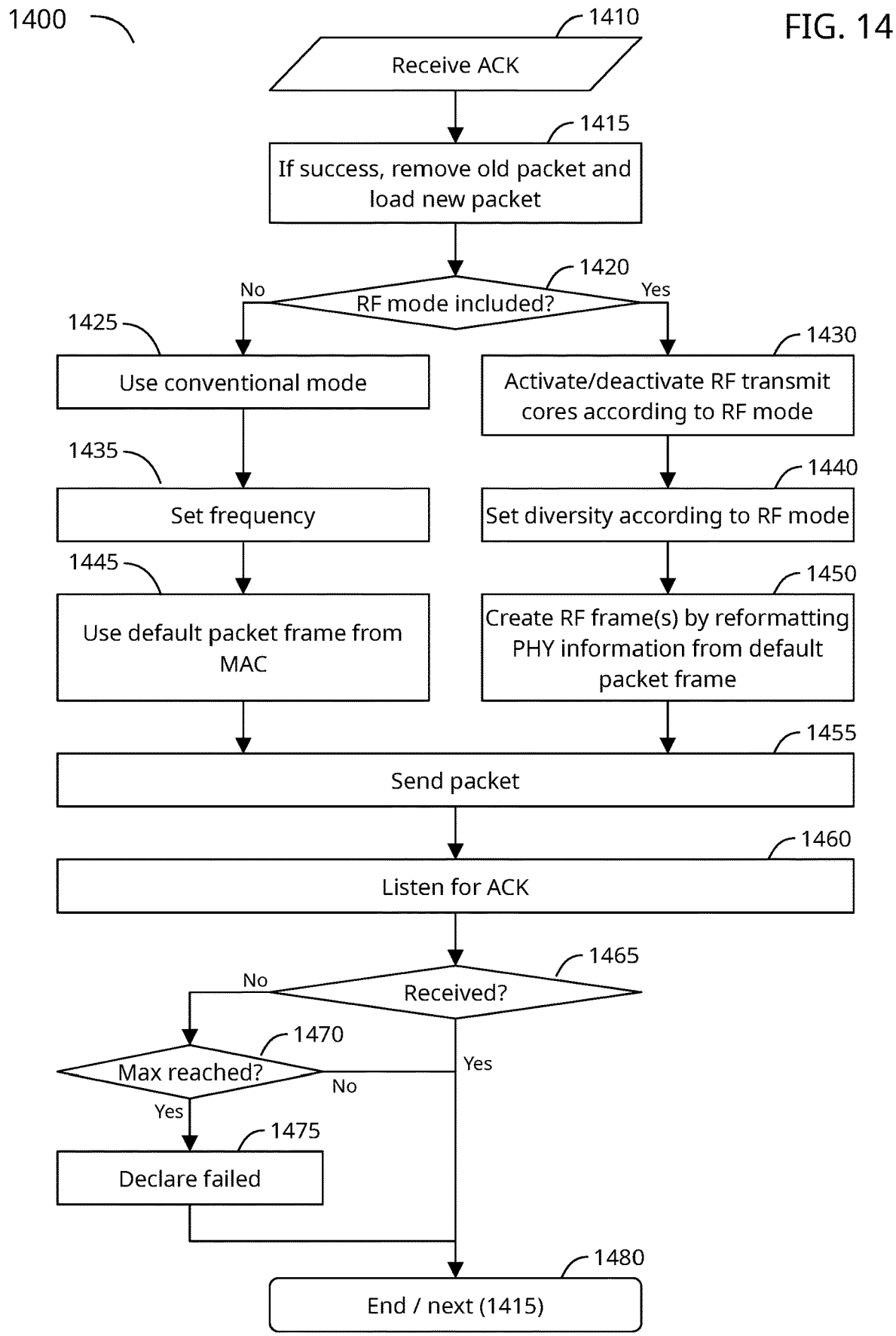
FIG. 14 illustrates an example transmission method that provides backward compatibility with conventional transceivers.

FIG. 14 illustrates an example transmission method 140 that provides backward compatibility with conventional transceivers. On its left-hand side, FIG. 14 shows conventional steps in a TDMA transmission, and on its right-hand side are steps specific for the present technology. This can be useful in a network that includes a mix of transceivers built conventionally and transceivers that include implementations of the technology. A conventional transceiver might have a single RF transmitter and receiver, whereas an implementation of the technology may, for example, be built as in FIG. 9 and include multiple RF transmitters and at least one RF receiver. The implementation includes a transmit queue with framed data packets provided by a MAC, wherein the packet frames include MAC headers, PHY headers, payload length, and other information relevant to a conventional transmission. The queue is headed by a first data packet, followed by a second data packet, etc. Transmission method 140 begins after transmitting the first data packet. Transmission method 140 comprises the following steps.

Step 1410—receiving an acknowledgement signal ACK from a receiver. The ACK signal may include information that the first data packet has been successfully received and recovered, or that information has been received but not recovered, or that expected data has not been received. The ACK signal may further include information specifying an RF mode including diversity to be used for transmitting a second data packet.

Step 1415—upon determining that the first data packet has been successfully received and recovered, removing the old (e.g., first) data packet from the transmit queue so that the new (e.g., second) data packet sits at the head of the transmit queue. Otherwise, keeping the old data packet in the transmit queue.

Step 1420—determining if the ACK signal includes information specifying an RF mode.

Step 1425—upon determining that the ACK signal does not include information specifying an RF mode, using a conventional mode and performing Step 1435 and Step 1445.

Step 1435—activating one RF transmitter and deactivating all other RF transmitters, and setting a transmit frequency for the one RF transmitter. Activating the one RF transmitter may include providing power to the one RF transmitter, turning on power management for the one RF transmitter, and turning on its power amplifier. Deactivating all other RF transmitters may include reducing or turning off their power, and turning off their power amplifiers. Setting the transmit frequency for the one RF transmitter may include starting a frequency generator in the one RF transmitter, programming the frequency generator to output a mixer frequency, and using the mixer frequency to generate the transmit frequency, for example by applying the mixer frequency to a mixer.

Step 1445—using the data packet at the head of the transmit queue (either the old data packet or the new data packet) as a default framed packet. Using the PHY information that is included in the default framed packet to configure the one RF transmitter, and proceeding with Step 1455. If the data packet is the old packet, i.e., if the earlier transmission was not successful, an implementation may modify a power level in the PHY information and configure the one RF transmitter for transmission with the modified power level. The method proceeds with Step 1455.

Step 1430—(following Step 1420) upon determining that the ACK signal does include information specifying an RF mode, activating and setting transmit frequencies for a first number of RF transmitters specified in the RF mode and deactivating all other RF transmitters. Activating the first number of RF transmitters may include providing power to the first number of RF transmitters, turning on power management for the first number of RF transmitters, and turning on their power amplifiers. Deactivating all other RF transmitters may include reducing or turning off their power, and turning off their power amplifiers. Setting the transmit frequencies for the first number of RF transmitters may include starting a frequency generator in each of the first number of RF transmitters, programming the frequency generators to output mixer frequencies, and using the mixer frequencies to generate the transmit frequencies, for example by applying each of the mixer frequencies to a mixer. In some implementations, the RF mode may specify transmit frequencies directly; in other implementations the RF mode may specify transmit frequencies as frequency offsets or as channel indices.

Step 1440—in each of the first number of RF transmitters, configuring a PHY in accordance with diversity information specified in the RF mode. The diversity configuration, in general, deviates from PHY information included in the default packet frame of the data packet at the head of the transmit queue.

Step 1450—for each of the first number of RF transmitters, creating an RF frame from the default packet frame of the data packet at the head of the transmit queue by replacing the included PHY information by information related to the PHY configuration of the respective RF transmitter. Then, for each of the first number of RF transmitters, framing the data packet with the RF frame. The method proceeds with Step 1455.

Step 1455—sending each framed data packet from each respective activated transmitter, in accordance with timing specified by an available time slot. In case the implementation uses conventional mode, the implementation may send the default framed data packet from the one RF transmitter. Otherwise, the implementation sends out the data packets framed with their respective RF frames from each of the first number of RF transmitters.

Step 1460—using the at least one RF receiver, listening for an ACK message, in accordance with timing specified for the available time slot.

Step 1465—determining if an ACK message has been received and if the receiver has successfully recovered the data packet at the head of the transmit queue.

Step 1470—upon determining that no ACK message has received or that the receiver has not successfully recovered the data packet at the head of the transmit queue, determining if a maximum number of retransmissions has been reached.

Step 1475—upon determining that a maximum number of retransmissions has been reached, declaring a transmission failure and removing the data packet at the head of the transmit queue from the transmit queue.

Step 1480—the method ends, or starts a new cycle at Step 1415.

Figure 15:
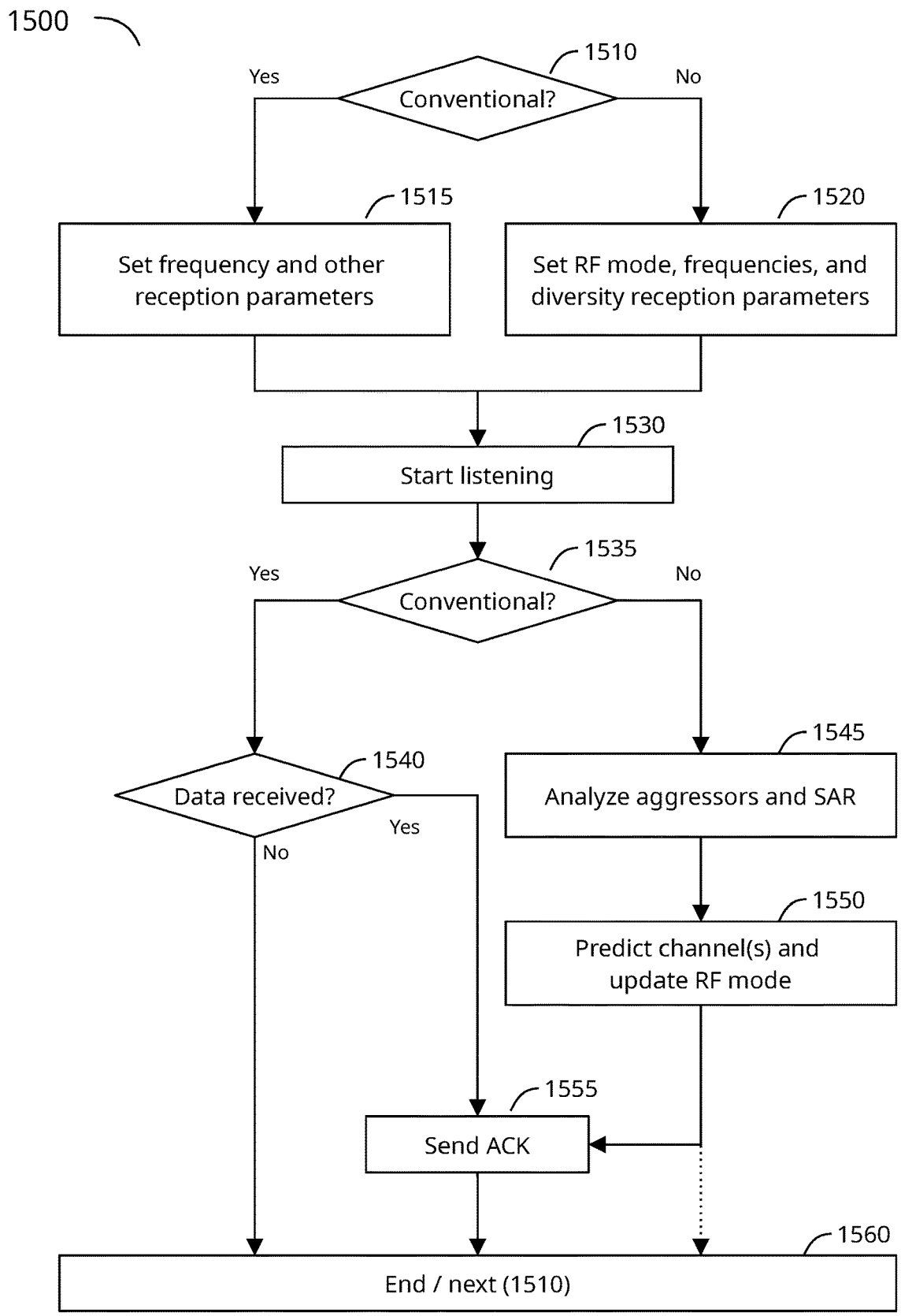
FIG. 15 illustrates an example reception method that provides backward compatibility with conventional transceivers.

FIG. 15 illustrates an example reception method 1500 that provides backward compatibility with conventional transceivers. The figure lists steps that would be part of a conventional reception method on the left-hand side, and steps that are specific to the present technology on the right-hand side. A receiver, for example receiver 950 in FIG. 9, performs reception method 1500 once per time slot, but may start the steps before or after the beginning of an available time slot, and may end the steps before or after the end of the available time slot. The receiver includes multiple RF receivers and at least one RF transmitter. The method comprises the following steps.

Step 1510—determining if reception is for a conventional transmission or a transmission according to an implementation of the technology. An implementation may make this determination based on an analysis after receiving prior data, and based on a prediction of channel conditions. An implementation may also make this determination based on knowledge about the transmitter whose data is to be received. For example, a conventional transmitter may only make a conventional transmission, whereas a transmitter in the disclosed technology may either make a conventional transmission or a transmission according to the disclosed technology.

Step 1515—upon determining that a conventional transmission is to be received, activating and setting a receive frequency for one RF receiver, and deactivating all other RF receivers. Activating the one RF receiver may include providing power to the one RF receiver. Setting the receive frequency for the one RF receiver may include starting a frequency generator in the one RF receiver, programming the frequency generator to output a mixer frequency, and using the mixer frequency to generate the receive frequency, for example by applying the mixer frequency to a mixer. The method may also set other reception parameters.

Step 1520—upon determining that a transmission according to an implementation of the technology is to be received, activating and setting receive frequencies and diversity reception parameters for a first number of RF receivers specified in a previously determined RF mode. Some implementations may deactivate other RF receivers, whereas other implementations may keep other receivers activated in order to monitor unused channel conditions. Activating the first number of RF receivers may include providing power to the first number of RF receivers. Setting the receive frequencies for the first number of RF receivers may include starting a frequency generator in each of the first number of RF receivers, programming the frequency generators to output mixer frequencies, and using the mixer frequencies to generate the receive frequencies, for example by applying each of the mixer frequencies to a mixer. In some implementations, the RF mode may specify receive frequencies directly; in other implementations the RF mode may specify receive frequencies as frequency offsets or as channel indices.

Step 1530—using the one RF receiver or the first number of RF receivers, starting to listen for a transmitted data packet in accordance with timing specified for the available time slot.

Step 1535—determining if reception is for a conventional transmission or a transmission according to an implementation of the technology.

Step 1540—for a conventional transmission, determining if a data packet has been received and successfully recovered. If not, then proceeding to Step 1560. If yes, then proceeding with Step 1555.

Step 1545—for receiving a transmission according to an implementation of the technology, analyzing aggressors and SAR. To analyze the aggressors and the SAR, the implementation may use the contexts in FIG. 11. For example, the implementation may analyze a signal-to-aggressor ratio in a first diversity channel by performing an analysis of a received pilot in the first diversity channel. The implementation may analyze a signal-to-aggressor ratio in the first diversity channel by performing an analysis of received data in the first diversity channel. The implementation may analyze a signal-to-aggressor ratio in a first diversity channel by listening to the first diversity channel without a pilot. The implementation may analyze a signal-to-aggressor ratio in a first diversity channel by listening to a second diversity channel, which may be an adjacent diversity channel. The implementation may analyze a signal-to-aggressor ratio in a first diversity channel by listening to the first diversity channel while transmitting in a different diversity channel.

An implementation determines a dominant aggressor, if possible, regardless of whether a data packet is being received. When the time for receiving a data packet in the available time slot has passed, the implementation attempts to recover its data, and regardless of its success in recovering the data, calculates a SAR, for example using the steps in FIG. 7. The implementation may keep a rolling window of $N_{total}$ time slots, ending with the available time slot, to calculate and update the total SAR as well as SARs for individual aggressors such as noise, interference, reflection, and obstruction.

Step 1550—predicting channel conditions for at least the first number of channels, using the information obtained in Step 1545 and available prior information that may include statistical characteristics and trends of the conditions in the channels. Based on the predicted channel conditions, an implementation updates the RF mode for a next data packet to be received to optimize a tradeoff between reception reliability, cost, and latency.

Step 1555—sending an acknowledgement ACK signal using the at least one RF transmitter. In case of receiving a conventional data packet from a conventional transmitter, the ACK signal is only sent upon successful reception and recovery of the data packet. However, in case of receiving a data packet in a diversity mode according to an implementation, the ACK signal may also (optionally) be sent to acknowledge failure of reception and recovery success. The implementation further uses the ACK signal to transmit the parameters of the updated RF mode. It may further include information about the dominant aggressor in the ACK signal.

Step 1560—end of reception method 1500, or the start of a new cycle at Step 1510.

Figure 16:
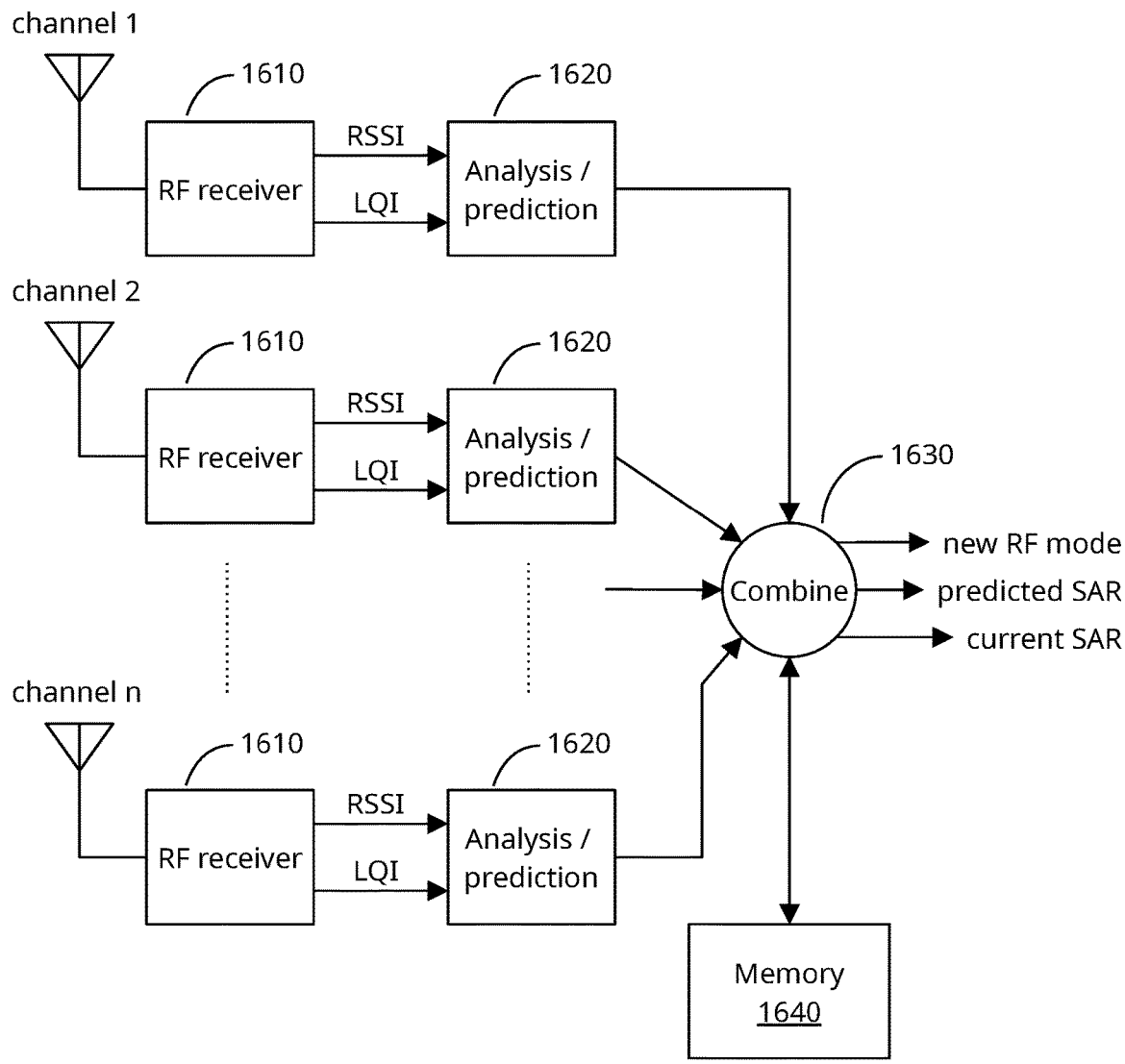
FIG. 16 illustrates a system for signal-to-aggressor (SAR) measurement.

FIG. 16 illustrates a system 1600 for signal-to-aggressor (SAR) measurement. System 1600 analyzes two or more diversity channels (the figure shows channel 1 ... n), for each of which it includes an RF receiver 1610, and an analyzer/predictor 1620. Each RF receiver 1610 outputs an RSSI signal and an LQI signal that it passes to the channel's analyzer/predictor 1620. Each analyzer/predictor 1620 outputs a current aggressor code and a predicted aggressor code, as further described with reference to FIG. 18, and may further output the current and predicted values for the LQI and the RSSI and forward all to combiner 1630. Combiner 1630 is operative to update the RF mode based on the received aggressor codes, and may calculate the SAR based on the received LQI values. Combiner 1630 may access a memory 1640 to log and store measured values that are required for calculating the SAR.

Figure 17:
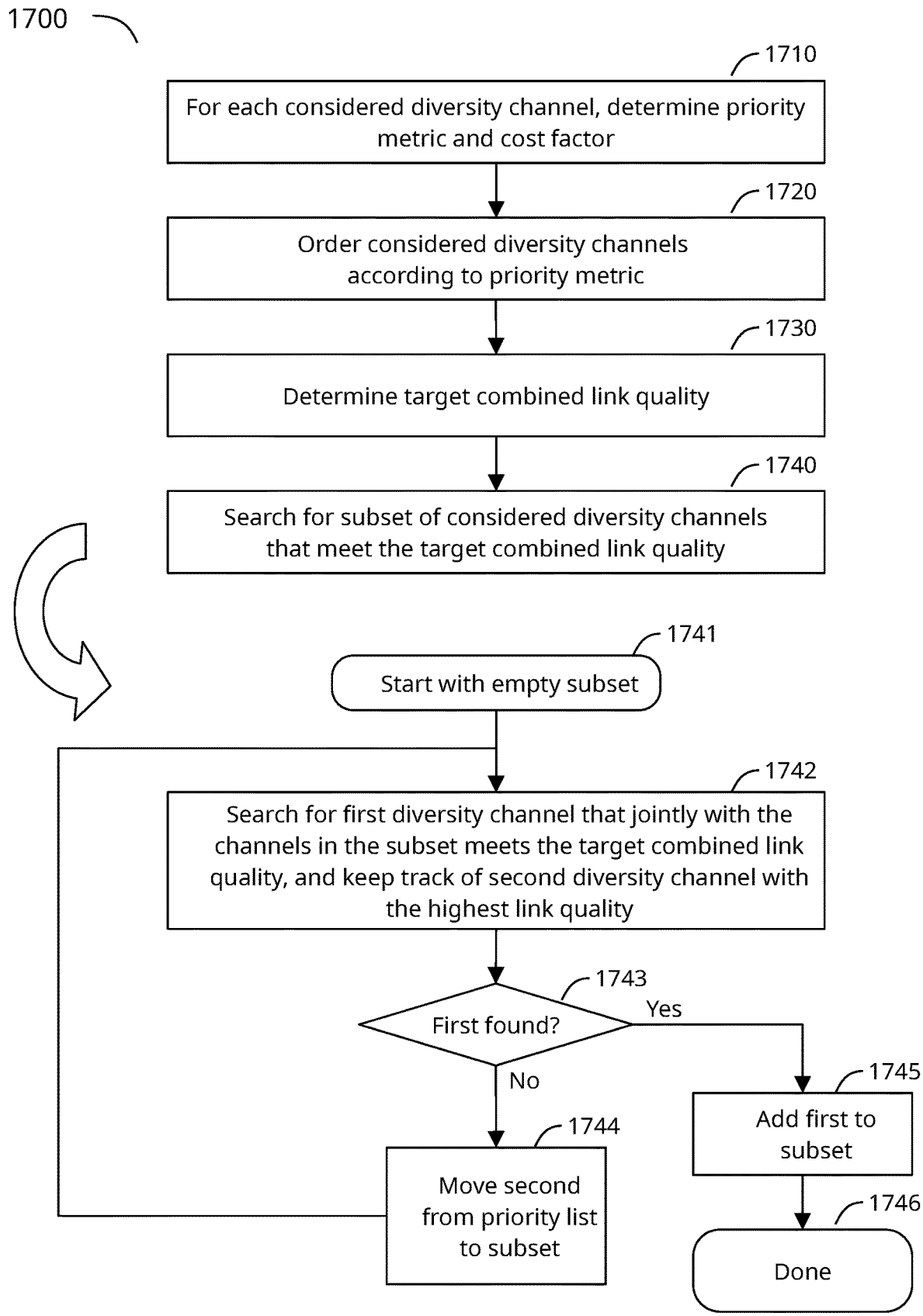
FIG. 17 illustrates an example method for determining an RF mode when multiple diversity channels are available.

FIG. 17 illustrates an example method 1700 for determining an RF mode when multiple diversity channels are available. Each diversity channel has a unique set of diversity parameters, which may include a channel frequency, a modulation type and code rate, a data rate, a scrambling permutation, a path, a polarization, and any other diversity parameters, including those that have been discussed in reference to FIGS. 12-13. Not all available diversity channels need to be considered. For example, an implementation may blacklist part of the diversity channels because their channel frequency is used by another in-network transmitter. Also, generally, a diversity channel may only be available when it doesn't share the channel frequency of another diversity channel that is already in use, or planned for use. An implementation may perform method 1700 in, for example, combiner 1630. Method 1700 includes the following steps.

Step 1710—for each considered diversity channel, determining a priority metric, a cost factor, and a link quality. Examples of a priority metric are LQI, LQI divided by the cost factor, LQI divided by transmission power, LQI divided by transmission fees, SAR, SAR divided by the cost factor, SAR divided by transmission power, SAR divided by transmission fees, bandwidth, RSSI, SNR, and any other priority metric that is important for a network manager. Example cost factors are power, latency, transmission fees, and any other cost that can be expressed as a number.

Step 1720—ordering the considered diversity channels according to the priority metric. An implementation may, for example, list the diversity channel with the highest priority metric first.

Step 1730—determining a target combined link quality. For example, if a combined link quality of 99% must be met, but no diversity channel has a link quality of higher than 90%, then a combination of three channels with respective link qualities 90%, 75%, and 40% would meet the target 99%, because $(1-0.9) \times (1-0.75) \times (1-0.6) = 0.1 \times 0.25 \times 0.4 = 0.01$.

Step 1740—searching, in the order of the priority list, for a subset of diversity channels that meets the target combined link quality. Many search methods are possible. An example of a linear search includes the following steps, ending in Step 1746.

Step 1741—starting with an empty subset (of considered diversity channels).

Step 1742—searching, in the order of the priority list, for a first considered diversity channel that jointly with considered diversity channels in the subset meets the target combined link quality, while keeping track of the channel (the second considered diversity channel) with the highest link quality.

Step 1743—determining if a first considered diversity channel was found. If a first considered diversity channel was found, the method proceeds with Step 1745. If not, the method proceeds with Step 1744.

Step 1744—moving the second considered diversity channel to the subset, and reverting to Step 1742.

Step 1745—adding the first considered diversity channel to the subset.

Step 1746—ending the search. The subset includes diversity channels that meet the target combined link quality. While there are $$\frac{1}{2} N_{channels} (N_{channels} - 1)$$

possible combinations of 2 channels, and many more for 3 channels, etc., this theoretic maximum may only be applicable if the implementation only uses frequency diversity. In many cases it may be impossible to combine two diversity channels that share the same frequency, so the actual number of combinations that need to be checked may be lower.

Figure 18:
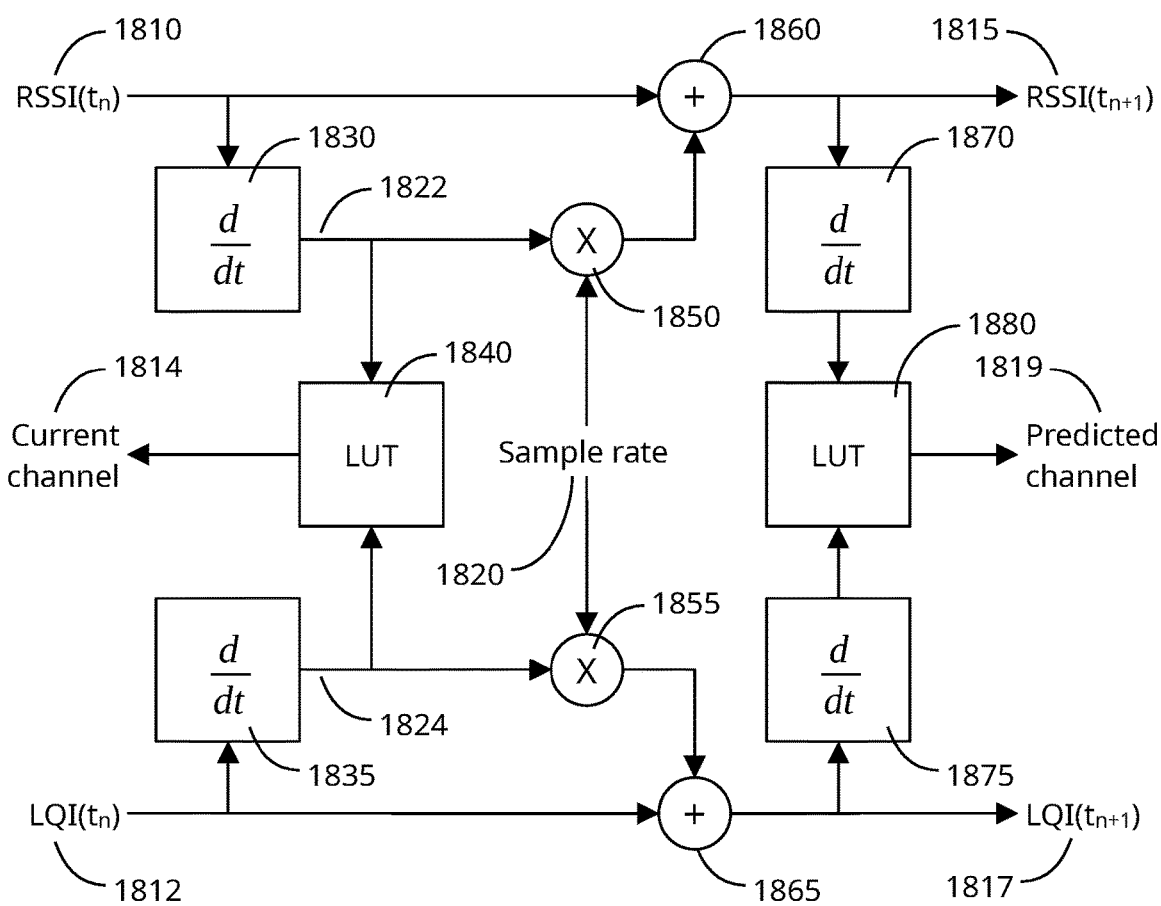
FIG. 18 illustrates an example system for aggressor characterization and channel prediction.

FIG. 18 illustrates an example system 1800 for aggressor characterization and channel prediction. System 1800 includes differentiator 1830, differentiator 1835, differentiator 1870, differentiator 1875, lookup table 1840, lookup table 1880, multiplier 1850, multiplier 1855, adder 1860, and adder 1865. For each data packet receive time slot $t_n$, system 1800 receives an RSSI input value 1810 and an LQI input value 1812. It outputs a current channel condition value 1814 and a predicted channel condition value 1819. It may further output a predicted RSSI value 1815 and a predicted LQI value 1817. The predicted RSSI value 1815, predicted LQI value 1817, and predicted channel condition value 1819 refer to time slot $t_{n+1}$. The differentiators may all determine the difference of a current differentiator input value at time slot $t_n$ and a previous differentiator input value at time slot $t_{n-1}$. The lookup tables each have two partial input values that together form the table address, and the lookup tables output the data at the table address. The lookup tables may comprise programmable memories or read-only memories. The sample rate 1820, applied to an input of each multiplier 1850 and multiplier 1855, equals the inverse of the duration between updates of RSSI and LQI. Such updates may come ones per data packet, for example when an implementation determines RSSI and LQI from a pilot that precedes the payload. However, some implementations may embed known data structures in the payload that can act as secondary pilots, allowing more frequent updates of RSSI and LQI, i.e. a higher sample rate. Other implementations may less regularly update RSSI and LQI, and thus use the same RSSI and LQI value for more than a single data packet.

The implementation in FIG. 18 shows a circuit for determining current channel condition value 1814 that uses the rate of change in RSSI and the rate of change in LQI as the metrics that, together, characterize the dominant aggressor. An example for the content of lookup table 1840 is given in FIG. 19. The implementation uses differentiator 1830 to determine the rate of change of RSSI 1822 and differentiator 1835 to determine the rate of change of LQI 1824. Together, rate of change of RSSI 1822 and rate of change of LQI 1824 form the memory address for lookup table 1840, which outputs current channel condition value 1814. Further implementations may use more advanced methods of aggressor characterization, including using additional differentiators to determine second order rate of change, and using delays longer than one time slot. In general, an application may use any type of digital filtering on each RSSI input value 1810 and/or LQI input value 1812 to determine parameter values, and use any combination of these parameter values derived from RSSI input value 1810 and LQI input value 1812 as parts of the address for lookup table 1840.

The implementation further shows a circuit for channel prediction using forward Euler. Apart from lookup table 1840, all blocks are involved in calculating the prediction from RSSI input value 1810, LQI input value 1812, rate of change of RSSI 1822, rate of change of LQI 1824, and sample rate 1820. Whereas the example implementation in FIG. 18 shows various blocks performing specific mathematic functions, a specific implementations might be built from logic gates determined by a compiler whose input could be a behavioral description at the register-transfer level (RTL), in a language such as Verilog or VHDL. The compiler output, while functionally equivalent with the RTL, may be optimized for various parameters, and may not look like the circuit in FIG. 18. However, all such implementations are fully within the ambit and scope of the present technology.

Other implementations may use different methods for channel prediction. For relatively slow changes in an aggressor, e.g., less than 25% change from one time slot to the next, an implementation may simply extrapolate conditions during an upcoming time slot, and/or use numerical integration methods such as forward Euler (explicit Euler), backward Euler (implicit Euler), and trapezoidal, or linear multistep methods such as Gear, Adams-Bashford, Adams-Moulton, and any other predictor-corrector methods known in the art. For relatively fast changes, e.g., more than 25% change from one time slot to the next, or conditions that last shorter than 3 time slots, an implementation may track statistics, such as for strong dominant aggressors that occasionally badly impair a channel's transmission, and predict changes in those occasional dominant aggressors. This may be the case when an environment suffers from burst noise and burst interference. Some implementations may track changes both in a channel's slow-changing dominant aggressor and in the channel's one or more fast-changing occasional dominant aggressors. For each dominant aggressor, an implementation attempts to determine its nature or type, such as noise, interference, reflection, obstruction, or any other source of impairment. The implementation uses the type of aggressor to determine an appropriate diversity to mitigate the aggressor's effects.

Some implementations use pattern recognition and machine learning to track and predict channel condition changes that are shorter than the duration of a time slot.

FIG. 19 illustrates an example of aggressor characterization. Table 1900 is based on the premise that an aggressor can be identified from the change in RSSI, and the aggressor trend (worse, no change, better) is shown by the change in LQI. Thus, the table has the rates of change in RSSI and LQI as its input (address), and as its contents the identified dominant aggressor type, an aggressor code, and a required update of the RF mode. The aggressor code is an index that signifies the identified dominant aggressor and its trend (worse, no change, better), and implementations can use the aggressor code as a command for updating the RF mode, for example as shown in the column RF Mode selection, or as shown in method 1700. When the data is received without impairment there is no identified dominant aggressor, or there is only some noise.

FIG. 20 illustrates an example channel conditions log 2000 with battery life estimation. Log 2000 may be kept by a receiver, and can be used to learn from prior actions. Therefore, for each time slot and for each used channel, log 2000 records the dominant aggressor, and changes made to the RF mode. The log may also record other parameters, such as, for instance predicted changes to a battery life estimate, and measured battery levels. An implementation may store a similar log in one or more of the transmitters, which it enables by including not only the RF mode but also the detected dominant aggressor in the ACK signal.

CONSIDERATIONS

Although the description has been described with respect to particular implementations thereof, these particular implementations are merely illustrative, and not restrictive. For example, much of the document focuses on noise, interference, reflections, and obstruction as dominant aggressors. As mentioned, may more aggressors exist, and an implementation may make any selection of aggressors. Some implementations may not use any of the listed classes of aggressors, but instead apply data analysis on the receiver metrics (LQI, RSSI, SAR, SNR, BER, PER, etc.) to create their own classification, adapting diversity based on self-learning, e.g., through trial and error. Although in this document the LQI is assumed to be higher for higher quality channels, in some implementations the LQI may be lower for higher quality channels, and thus formulas and operations may change accordingly. Most examples in this document are based on single-carrier transmissions, but some implementations may include multi-carrier transmissions, such as OFDM.

All features disclosed in the specification, including the claims, abstract, and drawings, and all the steps in any method or process disclosed, may be combined in any combination, except combinations where at least some of such features and/or steps are mutually exclusive. Each feature disclosed in the specification, including the claims, abstract, and drawings, can be replaced by alternative features serving the same, equivalent, or similar purpose, unless expressly stated otherwise.

Although the description has been described with respect to particular implementations thereof, these particular implementations are merely illustrative, and not restrictive. For instance, many of the operations can be implemented on a printed circuit board (PCB) using off-the-shelf devices, in a System-on-Chip (SoC), application-specific integrated circuit (ASIC), programmable processor, or in a programmable logic device such as a field-programmable gate array (FPGA), obviating a need for at least part of the dedicated hardware. All such variations and modifications are to be considered within the ambit of the present technology the nature of which is to be determined from the foregoing description.

Any suitable technology for manufacturing electronic devices can be used to implement the circuits of particular implementations, including CMOS, BiCMOS, JFET, MOS, NMOS, PMOS, HBT, MESFET, FinFET, bipolar, etc. Different semiconductor materials can be employed, such as silicon, germanium, SiGe, GaAs, InP, GaN, SiC, graphene, etc. Circuits may have single-ended or differential inputs, and single-ended or differential outputs. Terminals to circuits may function as inputs, outputs, both, or be in a high-impedance state, or they may function to receive supply power, a ground reference, a reference voltage, a reference current, or other. Although the physical processing of signals may be presented in a specific order, this order may be changed in different particular implementations. In some particular implementations, multiple elements, devices, or circuits shown as sequential in this specification can be operating in parallel.

Any suitable programming language can be used to implement the routines of particular implementations including C, C++, Java, JavaScript, compiled languages, interpreted languages and scripts, assembly language, machine language, etc. Different programming techniques can be employed such as procedural or object oriented. Methods embodied in routines can execute on a single processor device or on a multiple processor system. Although the steps, operations, or computations may be presented in a specific order, this order may be changed in different particular implementations. In some particular implementations, multiple steps shown as sequential in this specification can be performed at the same time.

Particular implementations may be implemented by using a programmed general-purpose digital computer, application-specific integrated circuits, programmable logic devices, field-programmable gate arrays, optical, chemical, biological, quantum or nanoengineered systems, etc. Other components and mechanisms may be used. In general, the functions of particular implementations can be achieved by any means as is known in the art. Distributed, networked systems, components, and/or circuits can be used. Cloud computing or cloud services can be employed. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application.

Thus, while particular implementations have been described herein, latitudes of modification, various changes, and substitutions are intended in the foregoing disclosures, and it will be appreciated that in some instances some features of particular implementations will be employed without a corresponding use of other features without departing from the scope and spirit as set forth. Therefore, many modifications may be made to adapt a particular situation or material to the essential scope and spirit.

The technology claimed is:

1. A wireless transmitter comprising:
   multiple radio-frequency (RF) transmitters that are configurable for one or more physical layer (PHY) parameters;
   an RF receiver, operative to receive an acknowledgement (ACK) signal;
   a processor, coupled with the multiple RF transmitters and coupled with the RF receiver, wherein the processor is operative to perform the following steps:
   (A) at a data input, receiving a framed data packet that includes first PHY parameters in a frame comprising payload data
   (B) determining if the ACK signal includes data specifying an RF mode and diversity information;
   (C) upon determining that the received ACK signal comprises data specifying an RF mode including diversity information:
      (i) determining second PHY parameters in accordance with the RF mode and the diversity information;
      (ii) replacing the first PHY parameters in the framed data packet with the second PHY parameters;
      (iii) activating a first number of the multiple RF transmitters in accordance with the diversity information and deactivating other RF transmitters;
      (iv) forwarding the frame to the first number of the multiple RF transmitters; and
      (v) configuring the first number of the multiple RF transmitters in accordance with the second PHY parameters.

2. The wireless transmitter of claim 1, wherein the second PHY parameters include a transmission power level.

3. The wireless transmitter of claim 1, wherein the second PHY parameters include a parameter related to frequency diversity.

4. The wireless transmitter of claim 1, wherein the second PHY parameters include a parameter related to time diversity.

5. The wireless transmitter of claim 1, wherein the second PHY parameters include a parameter related to space diversity.

6. A wireless receiver comprising:
multiple radio-frequency (RF) receivers that are configurable for one or more PHY parameters;
an RF transmitter, operative to transmit an acknowledgement (ACK) signal;
a processor coupled with the multiple RF receivers and coupled with the RF transmitter, wherein the processor is operative to perform the following steps:
 (A) configuring a first number of the multiple RF receivers with first PHY parameters, in accordance with first diversity settings included in a first RF mode;
 (B) using a second number of the multiple RF receivers, including the first number of the multiple RF receivers, to receive a respective second number of copies of a framed data packet, wherein the second number matches a number of used diversity channels;
 (C) for at least part of the second number of the multiple RF receivers, determining a current reception condition and predicting a future reception condition, wherein determining the current reception condition includes characterizing a dominant aggressor;
 (D) based on the predicted future reception condition, updating the first diversity settings to second diversity settings, and including the second diversity settings in a second RF mode;
 (E) including data specifying the second RF mode in an ACK signal; and
 (F) forwarding the ACK signal to the RF transmitter.

7. The wireless receiver of claim 6, wherein predicting the future reception condition includes using at least one of:
linear extrapolation
forward Euler,
backward Euler,
trapezoidal,
Gear,
Adams-Bashford, or
Adams-Moulton.

8. The wireless receiver of claim 6, wherein characterizing the dominant aggressor includes digitally filtering each an received signal strength indicator (RSSI) and a link quality indicator (LQI) over two or more time slots, and using one or more values obtained in the digital filtering to identify an aggressor type.

9. The wireless receiver of claim 6, further comprising determining an individual signal-to-aggressor rate (SAR), and wherein determining the individual SAR includes:
receiving a first number of data packets;
from among the first number of data packets, counting a second number of data packets that were received free of impairments;
from among the first number of data packets counting a third number of data packets that were received with impairments for which an individual dominant aggressor has been determined; and
calculating an individual SAR by dividing the second number by the third number.

10. The wireless receiver of claim 6, wherein updating the first diversity settings to second diversity settings includes one or more of:
changing a power level in response to a predicted change in noise and in response to a predicted change in obstruction;
changing a time diversity in response to a predicted change in burst noise or burst interference;
changing a frequency diversity in response to a predicted change in interference; and
changing a space diversity in response to a predicted change in reflection and/or in response to a predicted change in obstruction.

11. The wireless receiver of claim 6, wherein the processor is further operative to perform steps as follows:
receiving a pristine signal affected by one or more aggressors;
from among the one or more aggressors, determining a dominant aggressor by comparing individual signal-to-aggressor ratios of at least part of the one or more aggressors; and
compensating the pristine signal affected by the one or more aggressors by applying the dominant aggressor to obtain an approximation of the pristine signal.

12. A system for aggressor characterization and channel prediction, comprising electronic circuits as follows:
a received signal strength indicator (RSSI) input;
a link quality indicator (LQI) input;
an RSSI differentiator with an input coupled with the RSSI input;
an LQI differentiator with an input coupled with the LQI input;
a current channel lookup table (LUT) with a first partial address input coupled with an output of the RSSI differentiator and a second partial address input coupled with an output of the LQI differentiator, wherein the current channel LUT includes a programmable memory and/or a read-only memory;
a first sample rate multiplier with a first input configured to receive a sample rate value, and a second input coupled with the RSSI differentiator output;
a second sample rate multiplier with a first input configured to receive the sample rate value, and a second input coupled with the LQI differentiator output;
an RSSI adder with an input coupled with the RSSI input and an input coupled with an output of the first sample rate multiplier;
an LQI adder with an input coupled with the LQI input and an input coupled with an output of the second sample rate multiplier;
an RSSI prediction differentiator with an input coupled with an output of the RSSI adder;
an LQI prediction differentiator with an input coupled with an output of the LQI adder; and
a predicted channel LUT with a first partial address input coupled with an output of the RSSI prediction differentiator and a second partial address input coupled with an output of the LQI prediction differentiator, wherein the predicted channel LUT includes a programmable memory and/or a read-only memory.

13. The system for aggressor characterization and channel prediction of claim 12, wherein the current channel LUT is configured to output a current channel condition value based on signal values on its first partial address input and its second partial address input.

14. The system for aggressor characterization and channel prediction of claim 12, wherein the predicted channel LUT is configured to output a predicted channel condition value based on signal values on its first partial address input and its second partial address input.

15. The system for aggressor characterization and channel prediction of claim 12, further comprising a predicted RSSI output coupled with the output of the RSSI adder.

16. The system for aggressor characterization and channel prediction of claim 12, further comprising a predicted LQI output coupled with the output of the LQI adder.

17. The system for aggressor characterization and channel prediction of claim 12, wherein the sample rate value represents a frequency of updating RSSI and LQI input values.

* * * * *